United States Patent [19]

Scallon

[11] Patent Number: 4,574,348

[45] Date of Patent: Mar. 4, 1986

[54] HIGH SPEED DIGITAL SIGNAL PROCESSOR ARCHITECTURE

[75] Inventor: Gregory M. Scallon, Bellevue, Wash.

[73] Assignee: The Boeing Company, Seattle, Wash.

[21] Appl. No.: 499,842

[22] Filed: Jun. 1, 1983

[51] Int. Cl.[4] ............................. G06F 7/00; G06F 9/06
[52] U.S. Cl. ............................................................. 364/200
[58] Field of Search ... 364/200 MS File, 900 MS File

[56] References Cited

U.S. PATENT DOCUMENTS

| | | | |
|---|---|---|---|
| 3,445,822 | 5/1969 | Driscoll | 364/200 |
| 3,614,742 | 10/1971 | Watson et al. | 364/200 |
| 3,657,736 | 4/1972 | Boom et al. | 364/200 |
| 3,671,942 | 6/1972 | Knollman et al. | 364/200 |
| 3,710,351 | 1/1973 | Nakamura | 364/200 |
| 3,720,920 | 3/1973 | Watson et al. | 364/200 |
| 3,774,157 | 11/1973 | Tsui | 364/200 |
| 3,787,673 | 1/1974 | Watson et al. | 364/200 X |
| 3,943,494 | 3/1976 | Holmes, Jr. et al. | 364/200 |
| 4,071,890 | 1/1978 | Pandeya | 364/200 |
| 4,075,704 | 2/1978 | O'Leary | 364/200 X |
| 4,096,571 | 6/1978 | Vander Mey | 364/200 |
| 4,096,572 | 6/1978 | Namimoto | 364/200 |
| 4,128,881 | 12/1978 | Yamamoto et al. | 364/200 |
| 4,153,934 | 5/1979 | Sato | 364/200 |
| 4,171,536 | 10/1979 | Heuer et al. | 364/200 |
| 4,323,981 | 4/1982 | Nakamura | 364/200 X |
| 4,435,765 | 3/1984 | Uchida et al. | 364/200 |
| 4,449,184 | 3/1984 | Pohlman, III et al. | 364/200 |

Primary Examiner—Harvey E. Springborn
Attorney, Agent, or Firm—Schwartz, Jeffery, Schwaab, Mack, Blumenthal & Evans

[57] ABSTRACT

A data processor uses complex instructions and a sequence controller to cause first and second fields of such instructions to process data, respectively, by first and second ALUs, with a third field of such instructions containing address information for addressing locations in a data addressing unit, generating addresses for selecting such data from a data memory storage device.

13 Claims, 24 Drawing Figures eg. ILLIAC, PEPE, SIMDE, STARAN.---

FIG. 8

| 1 | 2 ADD UNIT | 3 A BUS | 4 R/W | 5 B BUS | 6 ALU1 | 7 | 8 C BUS | 9 ALU2 | 10 |
|---|---|---|---|---|---|---|---|---|---|
| 0 | $D+R_0 \to A$ | $i-n$ | R | $i-n$ | $D \to R_0$ | $b$ | - | $R_1+R_2 \to R_2$ | $\Sigma\Sigma$ |
| 1 | $D+R_0 \to A$ | $i-2n$ | R | $i-2n$ | $D+R_0 \to R_0$ | $c-b$ | - | $R_2+R_3 \to R_3$ | LPF |
| 2 | $D+R_0 \to A$ | $j-m+1$ | R | - | $R_0*2 \to R_x$ | $2(c-b)$ | $j-m+1$ | $D \to R_0$ | $f$ |
| 3 | $D+R_0 \to A$ | $j-2m+1$ | R | - | $R_x+R_0 \to R_0$ | $3(c-b)$ | $j-2m+1$ | $D-R_0 \to R_0$ | $g-f$ |
| 4 | $D+R_0 \to A$ | $i$ | $W_m$ | INPUT | $D+R_0 \to R_0$ | $a+3(c-b)$ | - | $R_0*2 \to R_x$ | $2(g-f)$ |
| 5 | $R_0+1 \to R_0 \to A$ | $i-3n$ | R | $i-3n$ | $-D+R_0 \to R_0$ | $a+3(c-b)-d$ | - | $R_x+R_0 \to R_0$ | $3(g-f)$ |
| 6 | $D+R_0 \to A$ | $j+1$ | R | - | $R_0+R_1 \to R_1$ | $\Sigma$ | $j+1$ | $D+R_0 \to R_0$ | $e+3(g-f)$ |
| 7 | $D+R_0 \to A$ | $j-3m+1$ | R | - | $R_1+R_2 \to R_2$ | $\Sigma\Sigma$ | $j-3m+1$ | $-D+R_0 \to R_0$ | $e+3(g-f)-h$ |
| 8 | $D+R_0 \to A$ | - | R | - | $R_2+R_3 \to R_3$ | BF | - | $R_0+R_1 \to R_1$ | $\Sigma$ |
| 9 | $R_{pw}+1 \to R_{pw}$ | - | - | - | $R_y + D \to R_0$ | - | $BF*2^{-K_1}$ | $R_3-D \to R_0$ | LPF - BF |
| 10 | $D+R_0 \to A$ | $\ell$ | R | $\ell$ | $R_{NOW}+1 \to R_{NOW}$ | SF | $SF*2^{K_2}$ | $R_4:R_0$ | MAX? |
| 11A | $D+R_0 \to A$ | $\ell-g$ | - | $\ell-g$ | $R_{NOW} \to R_{TPEAK}$ | - | - | $R_3:D$ | SPIKE? |
| 12C | $1+R_{FILL} \to A$ FILL POINTER | - | $W_0$ | - | $R_{NOW}+1 \to R_{NOW}$ | - | - | $R_0 \to R_4 \to$ OUTPUT | MAX PULSE AMP. |
| 13E | - | - | - | - | - | - | - | - | OPTIONAL |
| 12D | - | - | - | - | $R_{TPEAK} \to$ OUT | - | - | $R_4$: LIMIT | AMP. TEST |
| 13F | - | - | - | - | $R_{NOW}+1 \to R_{NOW}$ | - | - | $0 \to R_4$ | |
| 11B | - | - | - | - | $R_{NOW}+1 \to R_{NOW}$ | - | $T_{PEAK}*2^{K_2}$ | $0 \to R_4$ | |
| 12G | | | | | | | | | |
| 12H | | | | | | | | | |
| 13I | | | | | | | | $D \to$ OUTPUT | OUTPUT TIME OF PULSE PEAK |

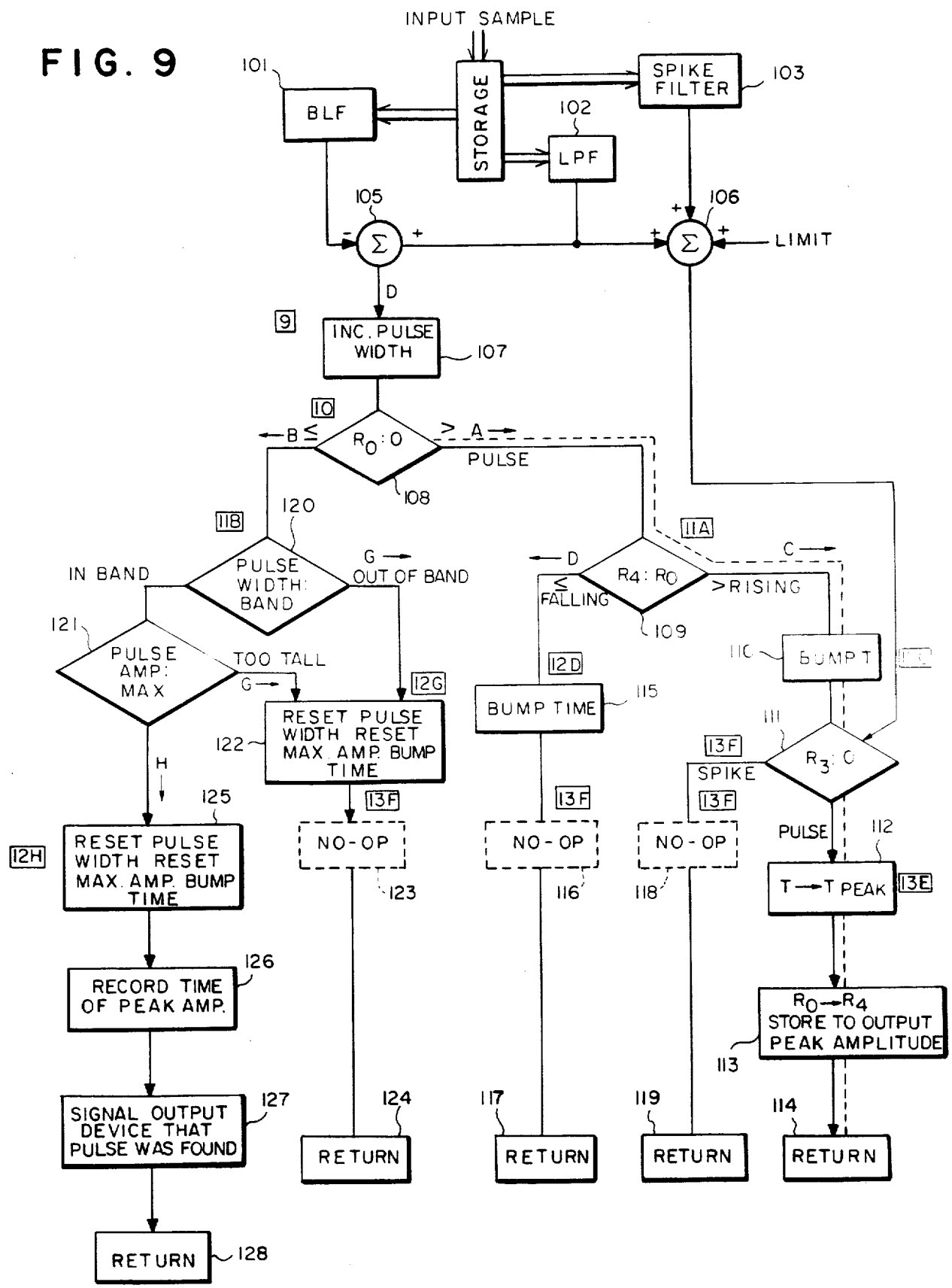

HIGH SPEED DIGITAL SIGNAL PROCESSOR ARCHITECTURE

GOVERNMENT RIGHTS

The Government has rights in this invention pursuant to Contract No. F04701-78-C-0040 awarded by the U.S. Air Force.

BACKGROUND OF THE INVENTION

1. Field of the Invention

The invention is in the field of computer architecture and more particularly in the field of computer architecture for a high speed digital signal processor.

2. Description of the Prior Art

Computer architectural designs may be visualized in terms of four basic categories: namely, (1) the single instruction, single data stream (SISD) systems such as the unit processor, (2) the single instruction, multiple data stream processors (SIMD) such as parallel processors or associative processors, (3) the multiple instruction, single data stream systems (MISD) such as the pipeline processor, and the (4) multiple instruction, multiple data stream systems (MIMD) such as the multiprocessor or multicomputer. Many types of computer architecture may be found to exist within the above categories with the particular architecture designed to solve particular types of computational problems.

In the field of signal processing there is a general requirement for a physically small and light-weight computing device, such as a microcomputer, capable of high throughput for providing real-time processing of data. Many of the high throughput prior art machines are ill suited for such purposes because of their large physical size, large power requirements or both.

Signal processing apparatus utilizing specially designed hardware logic suffers from an inherent inflexibility of not being able to utilize the same hardware for different types of computational problems. Additionally, such special purpose hardware, because of its limited applicability, is cost ineffective from the R&D point of view. Programmable microprocessors are generally too slow to be utilized in many fields of signal processing especially where high data throughput is required.

SUMMARY OF THE INVENTION

It is therefore an object of the invention to overcome the disadvantages of the prior art by providing a low cost, light-weight microprocessing system capable of high data processing throughput.

A more specific object of the invention is to provide a high speed digital processing apparatus suitable for real-time data processing. Such an application includes the utilization of the data processing system on a missile or rocket to analyze targets or threatening vehicles and the like. A designated optical tracker is one such application.

Another object of the invention is to provide a multiprocessing system in which a single compound or complex instruction is utilized to control the operation of a plurality of independent arithmetic and logic units. The program instructional steps are written to maximize data throughput by making efficient use of the operating capabilites of each of the arithmetic and logic units as well as their requirements for and access to data memory. Synchronization of the data processing operations of the arithmetic and logic units is ensured by the utilization of a single complex instruction which forces a synchronization in the execution of the component parts which form the complex instruction itself. These component parts specify the operation codes utilized in the separate arithmetic and logic units. Memory contention problems are eliminated by defining the program instruction sequence in such a manner as to ensure that only a single memory access is required in any one complex instruction step. Thus, a single sequence controller and microcode storage device is utilized to provide the overall data instruction sequence which eliminates memory contention problems and takes optimum advantage of the inherent parallelism of the particular problem in question.

The invention may be characterized as a data processor comprising a sequence controller, a program memory storage unit, a first and second arithmetic and logic unit (ALU), a data memory storage device for storing data, and a data address unit connected to the data memory storage device for generating data addresses to control storage and retrieval of data in said data memory storage device. The sequence controller generates complex instruction address signals identifying address of complex instructions. A plurality of the complex instructions form the program for solving a given algorithm. The program memory storage unit stores the complex instructions at address locations identified by the address signals. The first and second ALUs process the data in accordance with the complex instructions from the program memory storage unit. Each complex instruction has a first field for providing first instructions to the first ALU, and distinct, second fields for providing distinct, second instructions to the second ALU. The first and second fields of the complex instruction are transmitted simultaneously and respectively to the first and second ALUs for synchronizing the operation of the first and second ALUs in executing said program. The complex instructions include third fields for providing data address instructions to the data address unit. The data address unit is connected to receive the data address instructions of the third fields from the program memory storage device for selecting the data addresses to be generated. The first and second ALUs are connected to receive data from the data memory storage devices and the third fields of the complex instructions are transmitted simultaneously with the first and second fields to synchronize data storage and retrieval of said data memory storage device The invention may also be characterized as a high speed digital signal processor comprising a program memory storage unit, a plurality of arithmetic and logic units (ALUs), a data memory storage device, a data address selection unit and a selecting unit. The program memory storage device stores a program to be executed wherein the program solves a given computational problem. The program has a plurality of complex instructions, and each complex instruction is composed of a plurality of segments. The plurality of ALUs are operative to process data in accordance with the complex instructions wherein each ALU is operative in response to a predetermined one of the segments of the complex instructions. The data memory storage device stores data for processing by the plurality of ALUs and is operatively connected to each of the plurality of ALUs. The data address selection unit is connected to the data memory storage device and operative to select storage locations of the data memory storage device for reading and writing data therein. The data address selection unit is operative in response to a predetermined one of the segments of the complex instructions. The selecting unit is provided for simultaneously generating the plurality of segments for feeding same to the plurality of ALUs and the data address selection unit to synchronize operation of these units on an instruction-by-instruction basis. The complex instructions are operative to control the plurality of ALUs and the data address selection unit to effect simultaneous operation of the plurality of ALUs during execution of a major portion of the program.

The invention may also be described as a method of processing data comprising the steps of storing a plurality of complex instructions wherein each complex instruction has a plurality of separate fields, generating signals representative of the complex instructions, connecting a first arithmetic and logic unit (ALU) to receive signals representative of a first field of the complex instruction, connecting a second ALU to receive signals representative of a second field of the complex instruction and connecting a data memory address unit to receive a third field of the complex instruction. The set of complex instructions are stored in an instruction memory storage device, and the plurality of complex instructions collectively form a program for processing data. In generating the signals representative of the complex instructions, each of the plurality of fields is simultaneously generated. The method further comprises the steps of storing data to be processed in a data memory storage device having data memory storage locations accessed by the data memory address unit, programming the fields of the complex instructions to effect high utilization of each of said first and second ALUs during execution of said program and controlling execution of said program by simultaneously feeding the first, second and third fields of each complex instruction to the first and second ALUs and data memory address unit respectively.

BRIEF DESCRIPTION OF THE DRAWINGS

These and other objects of the invention will become clear in reference to the preferred embodiment described hereinafter taken in conjunction with the drawings, wherein:

FIG. 8 is a table illustrating the various fields of the complex instruction during different clock cycles for implementing the exemplary filter algorithm;

FIG. 9 is a flow diagram of the filter algorithm showing a more detailed representation of the attribute filtering as exemplary of the operation of the invention;

DETAILED DESCRIPTION OF THE PREFERRED EMBODIMENT

Figure 1:
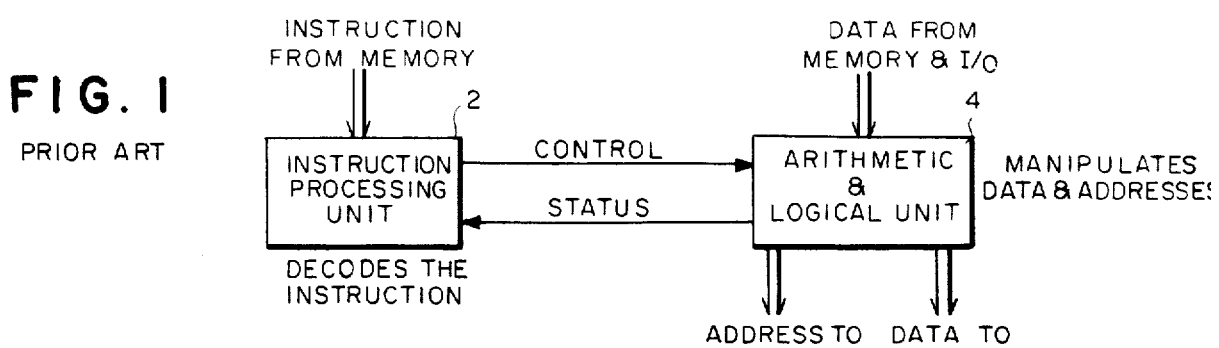
FIG. 1 is a block diagram showing a prior art single instruction, single data architecture.
Figure 2:
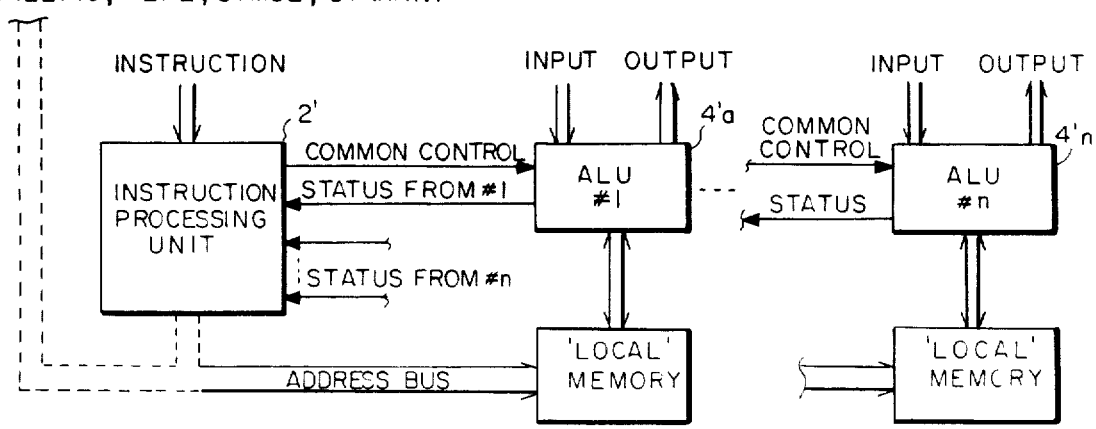
FIG. 2 is a block diagram of a prior art system showing a single instruction, multiple data system architecture.

In order to better appreciate the full scope of the invention, reference is made to FIGS. 1 and 2 illustrating certain prior art commuting systems. FIG. 1 shows a typical single instruction, single data computing system in which an instruction processing unit 2 determines the next instruction to be executed and forwards the instruction to an execution unit in the form of an arithmetic and logic unit 4. Data is operated upon by the execution unit 4 in accordance with the instruction and, upon completion, a new instruction is fed from the instruction processing unit 2 to be executed on the ALU4 utilizing additional data as required by the operand portion of the instruction.

In contrast, FIG. 2 illustrates a single instruction, multiple data machine (SIMD) in which an instruction processing unit 2' feeds the same instruction to a plurality of ALUs 4'a, . . . 4'n wherein each ALU operates upon the data in accordance with the instruction command. The single instruction multiple data organization of FIG. 2 allows multiple data streams to be processed in parallel thus permitting an increase in throughput. Typically, SIMD machines present the same instruction stream to each of the execution units so that the increase in throughput permits identical processing on similar but independent data streams. Examples of SIMD architecture include the ILLIAC, PEPE and STARAN.

Figure 3:
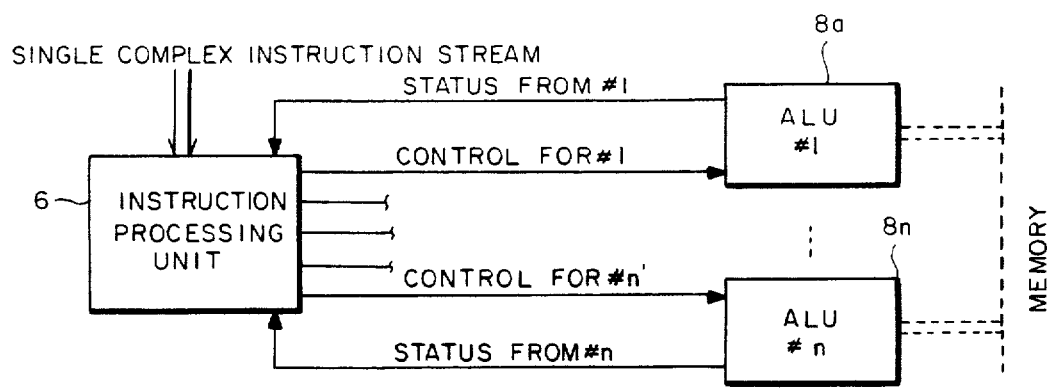
FIG. 3 is a block diagram showing the complex instruction, multiple data system architecture in accordance with the principles of the invention.

In simplest form, the invention may be visualized as illustrated in FIG. 3. In FIG. 3, an instruction processing unit 6 generates the sequential instruction stream but each generated instruction is composed of a plurality of different fields. The instruction is actually a complex instruction in which certain specified fields are fed to ALU8a, and other fields fed to the remaininq ALUs until the last field is fed to the last ALU8n. Thus, in effect, separate instructions are sent simultaneously to each execution unit. These instructions are transferred to their respective ALUs along control lines 1−n shown in FIG. 3. Each execution unit operates independently to process the data appearing in the data stream in accordance with the operational codes dictated by the instruction field which it sees. The execution units (ALUs) 8a-8n, although operating independently, are performing parts of a single computational problem in contrast to the MIMD systems in which several independent programs are simultaneously executed.

Figure 4:
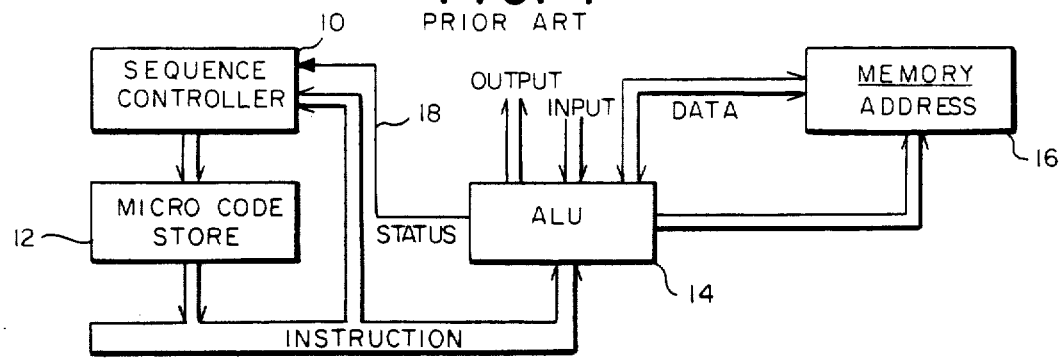
FIG. 4. is a block diagram showing a single data prior art architectural structure of a computing system.

A more particular embodiment of applicant's invention may be understood by first considering yet another prior art computer organization as shown in FIG. 4. FIG. 4 illustrates a sequence controller 10, a microcode storage device 12, an arithmetic and logic unit (ALU) 14 and a memory device 16. The sequence controller determines the next instruction to be executed based on certain bits or fields of the current instruction and based upon data fed from status lines 18 from the ALU 14. The status signals may be contingent upon the particular results of the computation most recently executed pursuant to the current instruction. The microcode storage device stores the particular microcode for the instruction repertoire and feeds the selected microcode instruction to the ALU 14 in response to the signals from the sequence controller 10. The ALU 14 operates upon incoming data, provides output data signals (either to memory or I/O registers) and generates the memory address signals for accessing the memory device 16. Thus, the ALU 14 is a multifunction device which calculates addresses, accepts input and output data and reads from and writes into the memory device. These operations, however, are not performed in parallel and thus the throughput of the system is necessarily limited because of the requirement for the sequential generation of the address and data information.

Figure 5:
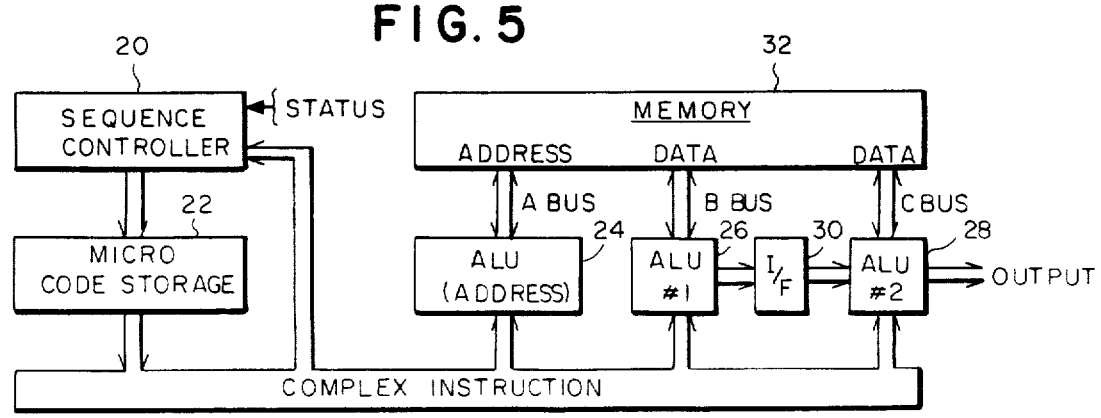
FIG. 5 illustrates a block diagram of the major components of the computing system in accordance with the invention.

With the prior art device of FIG. 4 in mind, the invention may now be illustrated in reference to FIG. 5. FIG. 5 shows a sequence controller 20, microcode storage device 22, and a plurality of ALUs designated 24, 26 and 28. ALU 26 is interconnected to ALU 28 by means of an interface 30. FIG. 5 also shows a memory device 32. ALU 24 is utilized solely for address generation and is connected to the address lines of the memory device 32. ALU 26 and ALU 28 are each utilized for arithmetic operations and the results of ALU 26 may be fed to ALU 28 by means of the interface 30. The utilization of separate ALUs 24, 26 and 28 permits certain types of operations to be carried out in parallel and eliminates the inherent address/data sequential characteristic of ALU 14 of FIG. 4. The complex instruction utilized in FIG. 5 is also composed of a plurality of different fields, each feeding designated ones of the ALUs 24, 26 and 28. Status signals from each of these ALUs are fed to the sequence controller 20 as well as a portion of the current complex instruction to permit the sequence controller 20 to determine the next instruction to be executed. Each instruction is fed to the microcode storage device 22 where it is decoded and the microcode complex instructions are fed via control line to each ALUs 24, 26 and 28. The parallel connected ALUs 26 and 28 may be allocated to different functions thus permitting a problem to be broken down into multiple parallel strings to enable high throughput. The separation of the memory address generation function into a separate ALU also saves significant time and provides an added degree of parallelism for taking optimal advantage of the complex instruction format. The ALUs 24, 26 and 28 are all kept in "lock-step" in that they are synchronized by the simple fact that a single complex instruction is decoded to drive each ALU in parallel.

A specific example of a signal processing application utilizing the principles of the invention may be seen in reference to FIGS. 6–22. For the purpose of explanation, it may be assumed that a data processing application involves the requirement of digital filtering. The example assumes it is desired to implement an orthogonal filter having two third order filters and a first order attribute filter. The two third order filters may be designated a baseline filter 36 and a low pass filter 38 as represented in the flow chart of FIG. 6. An attribute filter is also identified by number 40 which is included as an optional filter requirement shown in the optional dotted line oath. The low pass filter 38 is both preceded and followed by delays which will be more fully understood in connection with the discussion which follows.

Data samples inputted into the signal processor may be operated upon in a parallel fashion with the attribute filter 40 being utilized to provide an additional verification of a peak detection as shown by block 42. The peak detection is made subsequent to the summation of the data from the base line and low pass filters. The architectural configuration shown in the block diagram in FIG. 7 permits implementation of the signal processing calculations on data sampled every two microseconds to provide a throughput of 500,000 samples per second.

Figure 7:
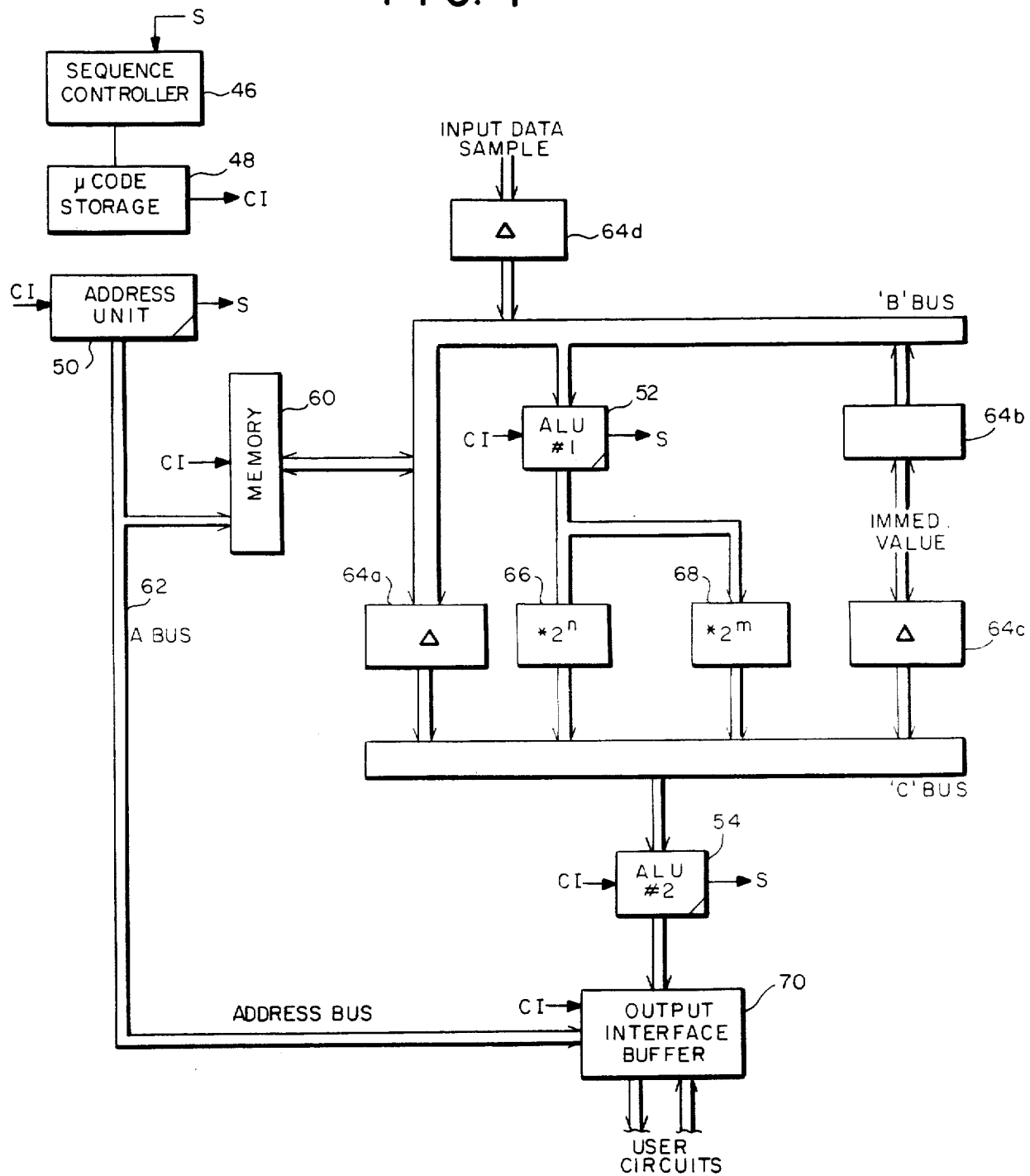
FIG. 7 is a block diagram showing the major components of the invention for performing the filter algorithm of FIG. 6.

FIG. 7 illustrates a particular embodiment of the invention utilizing a sequence controller 46, a microcode storage device 48, a discrete address unit 50, and separate, discrete arithmetic and logic units, ALU1 identified by number 52 and ALU2 identified by number 54. Address unit 50, ALU1 and ALU2 are connected to receive separate fields of the complex instruction from the sequence controller 46 and microcode storage device 48 in a similar fashion as shown in FIG. 5. The complex instruction bus is not shown in FIG. 7 for simplicity of illustration. A memory unit 60 is interconnected to the address unit 50 by means of an address bus 62, and a "B" bus interconnects the memory 60 with ALU1. A plurality of gate interface blocks (GIB) 64a–64d are also provided and are controlled by control lines (not shown) from the microcode storage device 48 in order to gate data in accordance with the decoded instruction. These gate interface blocks may be fabricated from tristate logic gates. GIB 64a interconnects the B bus to a "C" bus which itself is the main data bus feeding ALU2. GIB 64b and 64c provide immediate address values from the microcode storage device to the B bus and C bus, respectively. GIB 64d gates input data samples onto the B bus in accordance with the microcode instruction. Scalers 66 and 68 are provided for interconnecting ALU1 with the C bus. These scalers serve to provide multiplication factors of the data prior to feeding same to the C bus. ALU2 feeds an output interface buffer 70 which may be addressed along the address bus 62 to provide output data to user circuits or subsequent processing circuitry.

Figure 6:
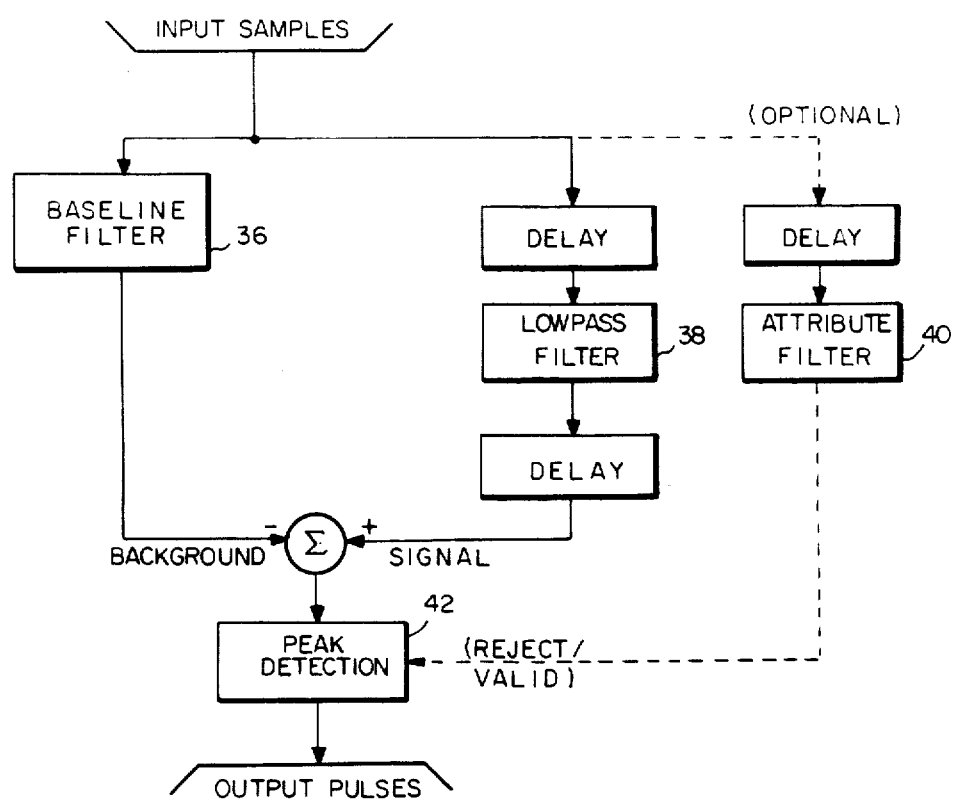
FIG. 6 illustrates a block flow diagram of a filter algorithm to be implemented for illustration operation of the invention.

The architectural configuration of FIG. 7 may be utilized to perform the digital filtering to provide the bandpass and low pass filters as well as the attribute filter functions shown in the flow chart of FIG. 6. The bandpass filter is implemented in accordance with the following equation:

$$B = 2^{-k_1} \Sigma\Sigma\Sigma(X_i - 3X_{i-n} + 3X_{i-2n} - X_{i-3n}) \quad 1$$

The low pass filter may be implemented as follows:

$$L = \Sigma\Sigma\Sigma(X_j - 3X_{j-m} = 3X_{j-2m}X_{j-3m}) \quad 2$$

The attribute filter implements the following equation:

$$S = 2^{k_2}(X_1 + X_{1-g}) \quad 3$$

In the above equations, $X_t$ is the input sample value at the instant of time t, and the remaining parameters are defined as follows:
i = current instance
j = current instance minus 6 (delayed 6 samples)
n = 8 sample (delay)
m = 4 sample (delay)
l = current instance minus 11 (delayed 11 samples)
g = 2 sample (delay)
$k_1 = 3$ $k_2 = 5$ FIG. 8 illustrates the important fields of the complex instructions during each clock sequence wherein each clock sequence corresponds to the execution of one instruction. The complex instruction is stored in the microcode storage device 48.

In general, 13 complex instructions are executed for every input data sample. These instructions are numbered clock 1 through clock 13. The program repeatedly executes these 13 clocks at a rate 13 times as fast as the input data stream. The first 10 instructions in each cycle are the same—the various filters operate on the input data. The final 3 instructions executed during clocks 11, 12 and 13, implement the pulse detection logic. These instructions are chosen by the sequence controller 46 based upon conditional states dynamically determined by the major components, i.e. Address Unit 50, ALU1 and ALU2. Letters A, C, E shown after the clocks 11, 12 13 designate a particular logic sequence chosen for the purpose of illustration.

As an aid in understanding the detailed operation of the invention for implementing the signal processing algorithm of FIG. 6, the bandpass equations 1 and 2 may be rewritten as follows:

$$B = 2^{-k_1} \Sigma\Sigma\Sigma(a - 3b + 3c - d) \qquad 4$$

$$L = \Sigma\Sigma\Sigma(e - 3f + 3g - h) \qquad 5$$

The terms in equations 4 and 5 appear in columns 7 and 10 of FIG. 8 as an aid in understanding the particular step being performed in the computational process. Column 1 of FIG. 8 identifies the clock cycle, which, in effect, identifies the program instruction currently being executed. Each row within each clock cycle corresponds to a field in the complex instruction which may be seen to control the address unit 50, address bus (A bus), the read/write command of the memory 60, the B bus, the instruction commands to ALU1 and ALU2 (columns 6 and 9, respectively) and the C bus. Additional control signals in other fields of the complex instruction are not shown in FIG. 8 but will be explained in relation to the detailed description which follows taken in conjunction with FIGS. 9-22.

FIG. 9 sets forth a flow chart illustrating the sequence of instructions set forth in FIG. 8. The dotted line path in FIG. 9 corresponds to the listed instruction sequence 1-10, 11A, 12C and 13E of FIG. 8. The alternate instruction paths ending in instructions 11A, 12D, 13F; 11b, 12G, 13F; and 11B, 12H, 13I are also shown in the flowchart of FIG. 9 and in the listing of FIG. 8. For ease of description, each decisional step in FIG. 9 is identified by numbers beginning with 101, and further, the relationship of the flowchart to the clock timing is indicated by enclosing the clock timing (column 1 of FIG. 8) in a rectangular box adjacent the beginning of the relevant decisional logic steps. In FIG. 9, blocks 101, 102 and 103 correspond respectively to the baseline filter calculations, low pass filter calculations and attribute filter calculations. The attribute filter is taken, for the purpose if illustration, to be a spike filter calculation. These blocks correspond respectively to blocks 36, 38, and 40 of FIG. 6. Block 104 of FIG. 9 identifies the necessary storage and retrieval of data from the input data stream. Summing block 105 is performed to subtract the signal information (low pass filter) from the background (baseline filter) prior to proceeding to the peak detection logic described by the remainder of the logic blocks in FIG. 9. These additional logic blocks correspond to the peak detection block 42 of FIG. 6 conditioned by the added requirements of the spike filter calculation. The summing step 106 is utilized as part of these additional logic blocks. The peak detection logic blocks are identified by numbers 107-114 shown in FIG. 9.

It may be seen that FIGS. 10-22 show identical hardware and illustrate in detail the various control and data paths established during the clock pulses C1-C13. Each figure is seen to comprise the address unit 50, memory unit 60, ALU1 (number 52), ALU2 (number 54), address bus (A bus) 62, gate interface blocks 64a-64d, scalers 66 and 68 and output interface buffer 70. The elements illustrated in FIGS. 10-22 correspond to those shown in FIG. 7 with the sequence controller 46 and microcode storage device 48 omitted for simplicity of illustration. It is to be understood, however, that the complex instructions stored in the microcode storage device 48 produce a plurality of separate instructional fields (as shown in FIG. 8) which are fed to each of the units 50, 52, 54, 60, 62, 64, 66, 68 and 70 as indicated by the input lines "CI" feeding each of these devices. Although the same designation "CI" is used, it is understood that different portions of the complex instruction are fed to each of the units 50, 52, 54, 60, 62, 64, 66, 68 and 70. Additionally, the address unit 50, ALU1 and ALU2 produce status signals identified by the output lines "S" which are fed to the sequence controller 46 (see FIG. 7) so that the next instructional sequence may be determined during the instruction processing performed by the sequence controller 46. The clock signals feeding each of the units of FIG. 10 have been omitted for simplicity of illustration.

The interrelationship of FIGS. 8 and 9 with FIGS. 10-22 will become clear from the following description of each clock sequence. The columns of FIG. 8 are first described to define the functions of the various units and to define the uses of the internal registers of the address unit 50, ALU1 and ALU2.

The ADDRESS UNIT 50

Column 2 shows the significant internal registers of the address unit 50. Register "$R_o$" is the "instance" counter. It advances by one increment on each data sample. All accesses to the memory unit 60 are referenced off of the counter $R_o$. The pulse width measurements are maintained in a dedicated register within the address unit. This register is initialized to a count = "−minimum acceptable pulse width," i.e., the minimum number of samples which constitute a valid pulse. When a pulse is detected, i.e., the filtered waveform is positive and subsequently falls to zero or below, the pulse width register is tested. If the value in the pulse width register is a small positive number ( Pulse width max. −Pulse width min.) then the observed pulse "passes" the pulse width test.

A list of the dedicated registers for the address unit 50 is as follows:

$R_o$ = instance counter (or sample counter)
$R_{pw}$ = Pulse width counter
$R_{fill}$ = Output buffer fill pointer (where the detected pulses are stored for subsequent processing by downstream devices)
$R_{pwmin}$ = Minimum pulse width
$R_{pwmax}$ = Width of allowed pulse width window.

A BUS 62

This A bus shown in column 3 passes the output of the address unit 50 to the memory 60 to select a specific memory location, and to the output buffer 70 for the same purpose.

R/W

The read/write field listed in column 4 is used to control the activity of the memory and the output buffer 70. The meaning of the various symbols is as follows:

R means that the memory unit 60 will perform a read operation. The contents of the memory word addressed by the current contents of the A bus is placed onto the "B" bus.

$W_m$ means that the memory unit 60 will perform a write operation. The contents of the 'B' bus is written into the memory word addressed by the current contents of the A bus.

$W_o$ means that the output buffer 70 will accept the value presented by ALU2 (54) and record it into the location designated by the contents of the A bus.

B BUS

The field in column 5 shows the contents of the B bus. The B bus does not cooperate in processing on clocks 9, 12, and 13.

C BUS

The field in column 8 shows the contents of the C bus. The C bus is involved in the following instructions: 3, 4, 7, 8, 10, 12C, 13I.

ALU1

ALU1 calculates the baseline filter (equation 1). This value is 'offset' by the minimum pulse amplitude (i.e., $R_3$ is initialized to the minimum acceptable pulse amplitude).

ALU 1 also calculates the spike filter, maintains the clock (sample count), and saves the time (sample count) of the pulse peak value. A list of the dedicated registers of ALU1 is as follows:

$R_o$ = workspace register
$R_1$ = 1st integrator of baseline filter
$R_2$ = 2nd integrator of baseline filter
$R_3$ = 3rd integrator of baseline filter (baseline filter value)
$R_{now}$ = instance counter or clock (sample rate)
$R_{tpeak}$ = holds the "time of a peak"
$R_y$ = bias value for spike filter
$R_x$ = workspace register

ALU2

ALU2 calculates the low pass filter and saves the peak value. It also performs the pulse amplitude upper limit test and test for spikes. It also presents the peak amplitude and time of peak to the output interface buffer. The dedicated registers of ALU2 are as follows:

$R_o$ = workspace
$R_1$ = 1st integrator of low pass filter
$R_2$ = 2nd integrator of low pass filter
$R_3$ = 3rd integrator of low pass filter (low pass filter value)
$R_4$ = maximum (low pass - baseline) pulse amplitude
$R_x$ = workspace register
$R_{limit}$ = pulse amplitude limit The flow chart of FIG. 9 is now described in relation to the clock pulses of FIG. 8 and the hardware arithmetic to logic units of FIGS. 10-22.

Clock 01

Figure 10:
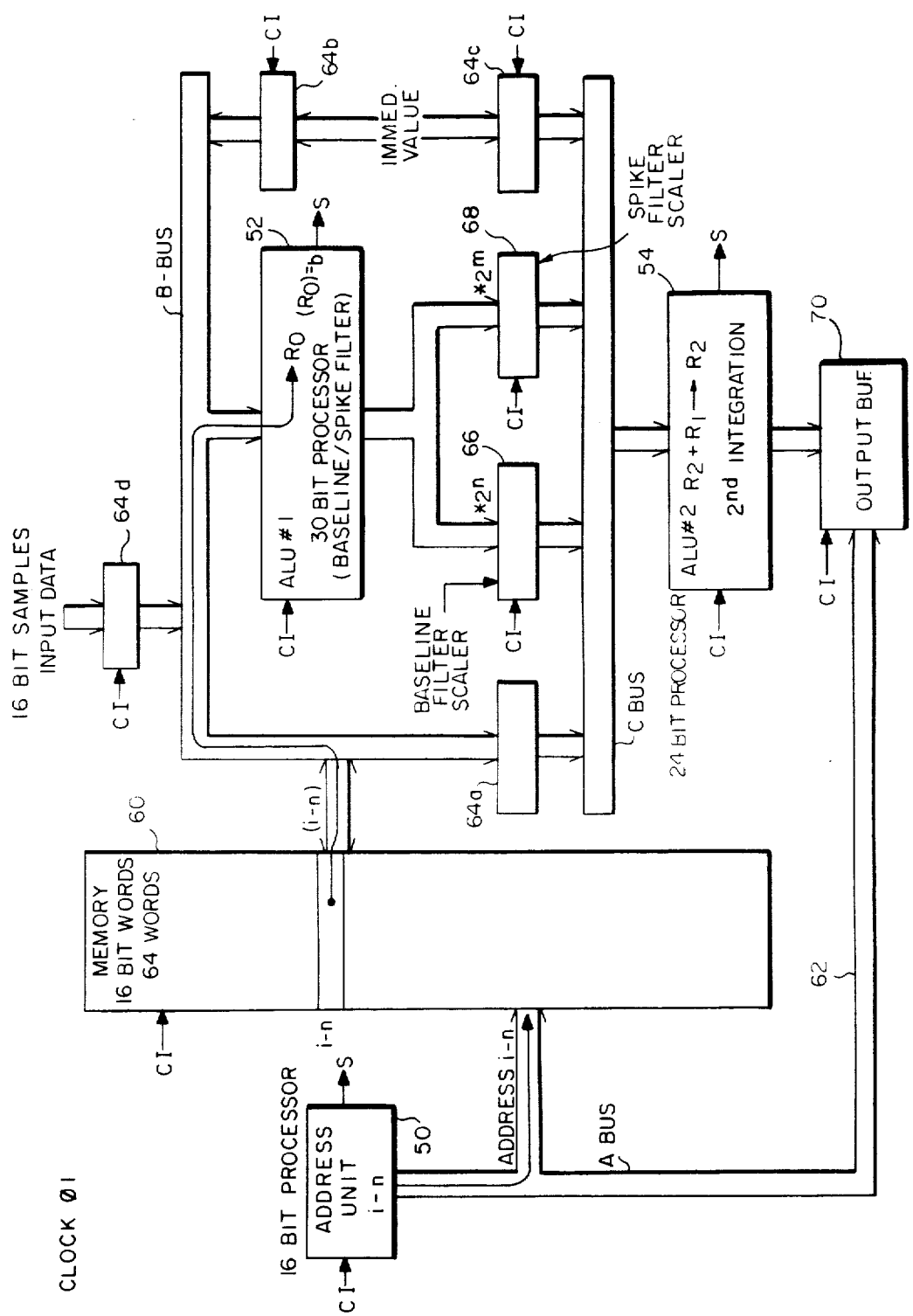
FIGS. 10-22 show block diagrams of the major components of the system architecture in implementing the complex instructions shown in FIG. 8.
Figure 11:
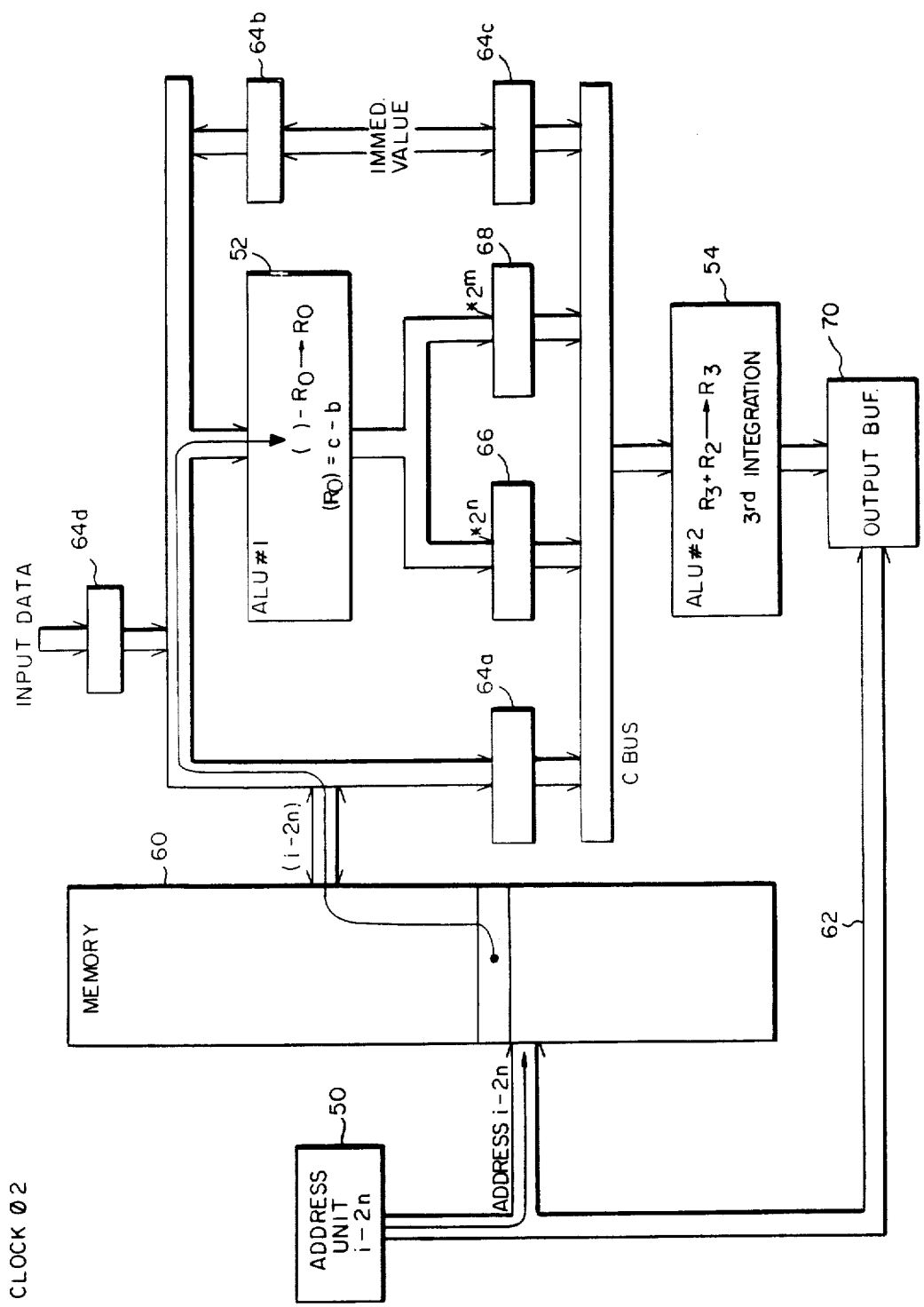

FIG. 10 illustrates the state of the various processing units at the first clock cycle. An immediate address $1-n$ (for example, n=8) is fed as an input parameter to the address unit 50 with an instruction command illustrated in column 2 such that the data in the input register $(D=1-n)$ is added to the register $R_0$ within the address unit 50. Register $R_0$ is initialized such that $R_0 = i - 1$, where i is the current data sample being processed. As a result, the address unit generates the value $i - n$ which is fed to the address bus A as indicated in column 3 of FIG. 8 and shown in FIG. 10. At the same time, a complex instruction field command is sent to the memory 60 indicating a read instruction should be performed as shown in column 4 of FIG. 8. The read instruction basically transfers the contents of the $i - n$ register, designated $(i-n)$ or "D," within the memory 60 to the B bus. The data on the B bus is fed to the $R_0$ register of ALU1 as indicated in column 6 of FIG. 8 and shown in FIG. 10. Loading of the B bus data, D, into the $R_0$ register of ALU1 is dictated by the complex instruction field command from the microcode storage device 48. As may be seen in column 7 of FIG. 8, the loading of the content of address $i-n$ into the $R_0$ register of ALU1 corresponds to the b term in equation 4 for the bandpass filter.

It may also be seen from FIGS. 8 and 10 that the C bus is not busy during the first clock cycle, but that ALU2 is busy adding two terms, namely, the contents of internal registers $R_1$ and $R_2$. The sum of these two registers is stored in register $R_2$. The summation occurring within the internal registers $R_1$ and $R_2$ of ALU2 corresponds to a second integration term for (i.e., the second summation) of equations 2 or 5. This summation is being performed on data previously fed into the filter. In fact, it will become apparent from the description below that ALU1 basically implements equation 1 (or its alternate form equation 4), and that ALU2 basically implements equation 2 (or its alternate form equation 5). However, the complex instructional steps shown in FIG. 8 basically represent equations 1 and 2 broken down into a series of steps which are intermixed such that the two filters can implement their equations simultaneously and in such a manner that each filter operates in a non-competitive manner with regard to memory access. The programming sequence is selected to optimize the utilization of ALU1 and ALU2, and as such, ALU2 operates on different portions of the data stream during at least some of the clock cycles while ALU1 is operating on the current data sample $X_i$.

Clock 02

During the second clock cycle an immediate address of "$1-2n$" is also fed to the address unit which proceeds then to access the memory address $i-2n$. In reference to FIG. 11, it may be seen that the content of the address $i-2n$ from the memory unit 60 is fed to the B bus and gated into ALU1 as input data. The arithmetic operation in which the input data and the contents of register $R_0$ are subtracted is then performed by ALU1 with the resulting product being stored in register $R_0$. The term $i-2n$ corresponds to the b term in equation 4, and the content of register $R_0$ during clock pulse 2 is seen to correspond to the term $c-b$. Again, the C bus is not busy. However, ALU2 is still busy performing the third summation of equation 2 (alternate form of equation 5). It is noted that the operation performed by ALU2 is done entirely within its internal registers without requiring any access to memory. Thus, ALU1 is the sole unit which requires access to memory during the second clock cycle.

Clock 03

Figure 12:
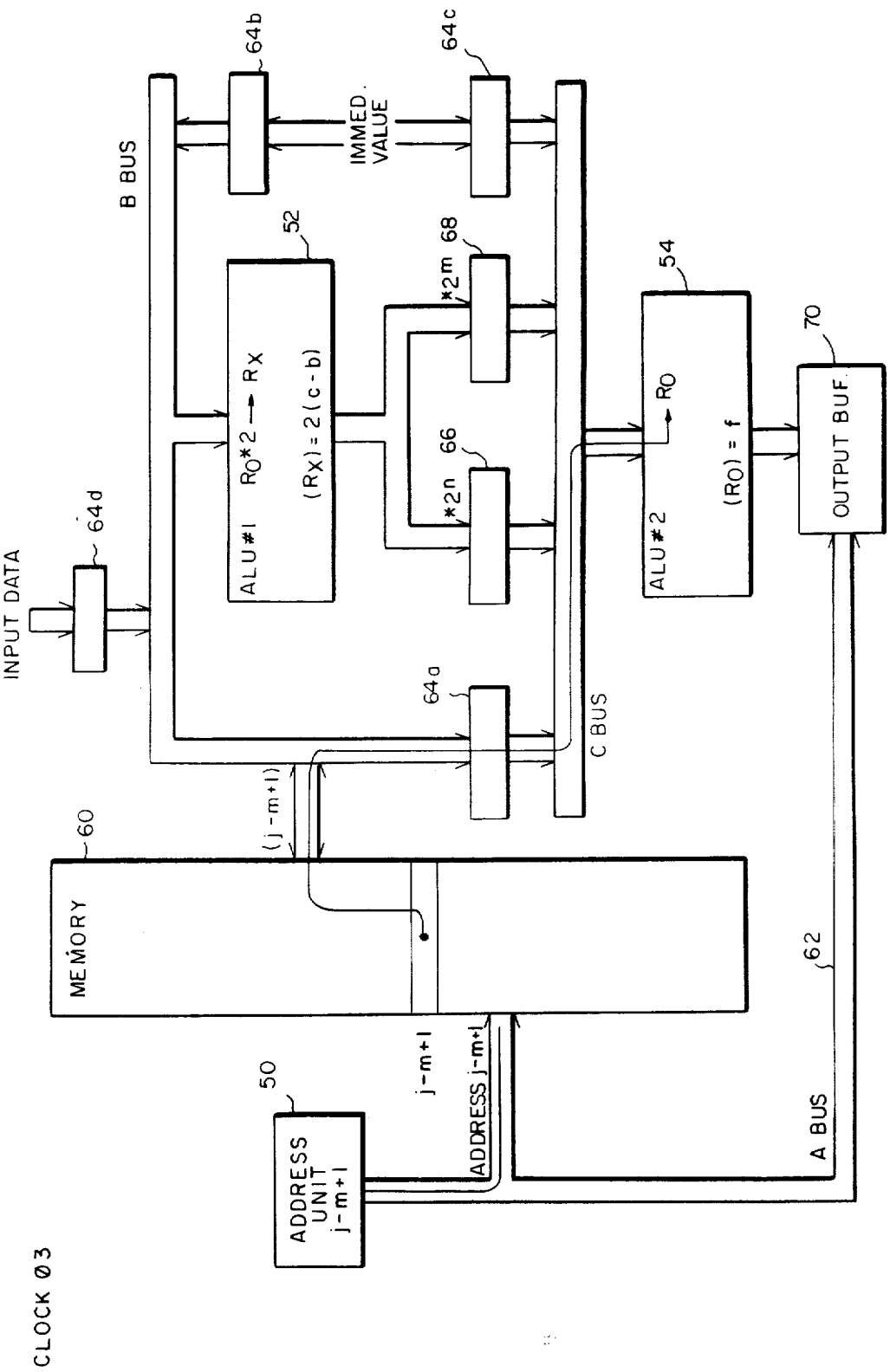

During the third clock cycle an immediate address is fed to the address unit so that the address bus contains the address corresponding to $j-m+1$. Access is made to the memory location $j-m+1$ during a read cycle of the memory unit 60 dictated by a field of the complex instruction. The contents of location $j-m+1$ are now gated onto the C bus as shown in FIG. 12 via the gate interface block (GIB) 64a. It is noted that this time the instruction command to ALU1 does not gate data from the B bus into ALU1, but rather commands ALU1 to perform an internal operation in which the contents of register $R_0$ are multiplied by a factor of 2. This multiplication amounts to a shifting operation with the results stored in a temporary register $R_x$. The contents of register $R_x$ thus correspond to the term $2(c-b)$ as shown in column 7 of FIG. 8 and as corresponding to an intermediate step in deriving the two middle terms of equation 4. It will be seen that the desired multiplication by three is implemented in the clock cycle 4 as described below. The contents of memory location $j-m+1$ fed from the C bus to ALU2 are now utilized as input data stored in the internal register $R_0$ of ALU2. It is to be noted that the term $j-m+1$ corresponds to the second term in equation 2 or the f term in equation 5. The fact that the index in the second term of equation 2 is given by $j-m$ rather than $j-m+1$ indicates that ALU2 is performing a data calculation on the "next" set of sample data as compared to the current bandpass filter calculation. In this connection, it is noted that the low pass filter calculation utilizing the index j is performed on data which corresponds to the current sample data $X_i$ delayed by six samples. Thus, memory 60 has previously stored this sample data in location $j-m+1$ which is now being processed by ALU2 during the third clock cycle.

Clock 04

Figure 13:
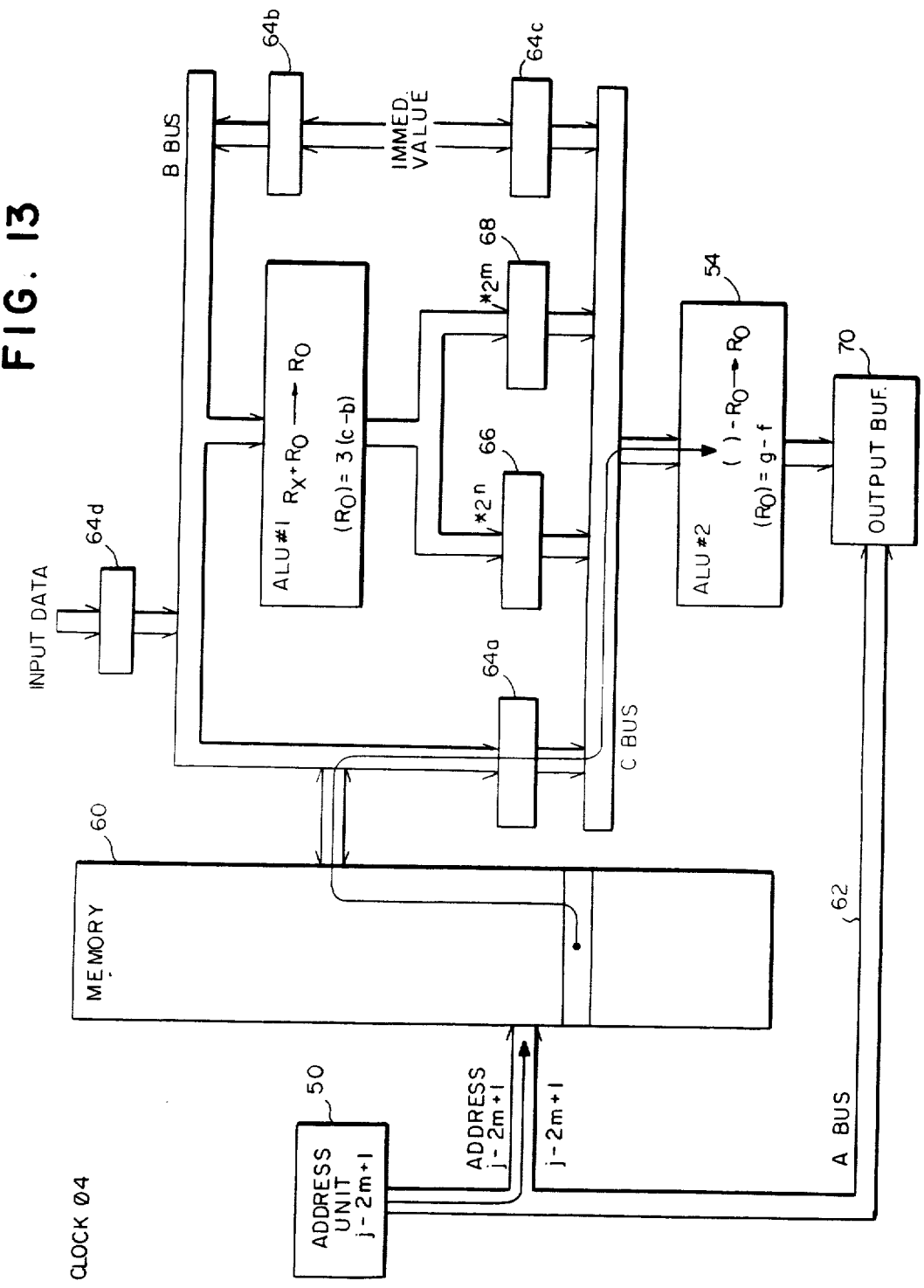

FIG. 13 illustrates the data path within the system hardware during the fourth clock cycle. An immediate address is fed to the address unit so that the address lines now address the $j-2m+1$ location in memory 60. The read command sent to memory unit 60 effects the transfer of the content of the data in the $j-2m+1$ location. This data is gated onto the C bus via GIB 64a where it is placed into an input register of ALU2. The command to ALU2 is effective for subtracting the contents of internal register $R_0$ from the input data with the result stored in register $R_0$. The subtraction performed in ALU2 corresponds to the term $g-f$ in equation 5 as shown in column 10 of FIG. 8.

While ALU2 is accessing memory and performing the subtraction indicated, ALU1 is busy adding the contents of the temporary register $R_x$ to the contents of register $R_0$, placing the results in register $R_0$. This operation provides the required multiplication by the factor of 3 giving the term $3(c-b)$ corresponding to the middle terms of equation 4.

Clock 05

Figure 14:
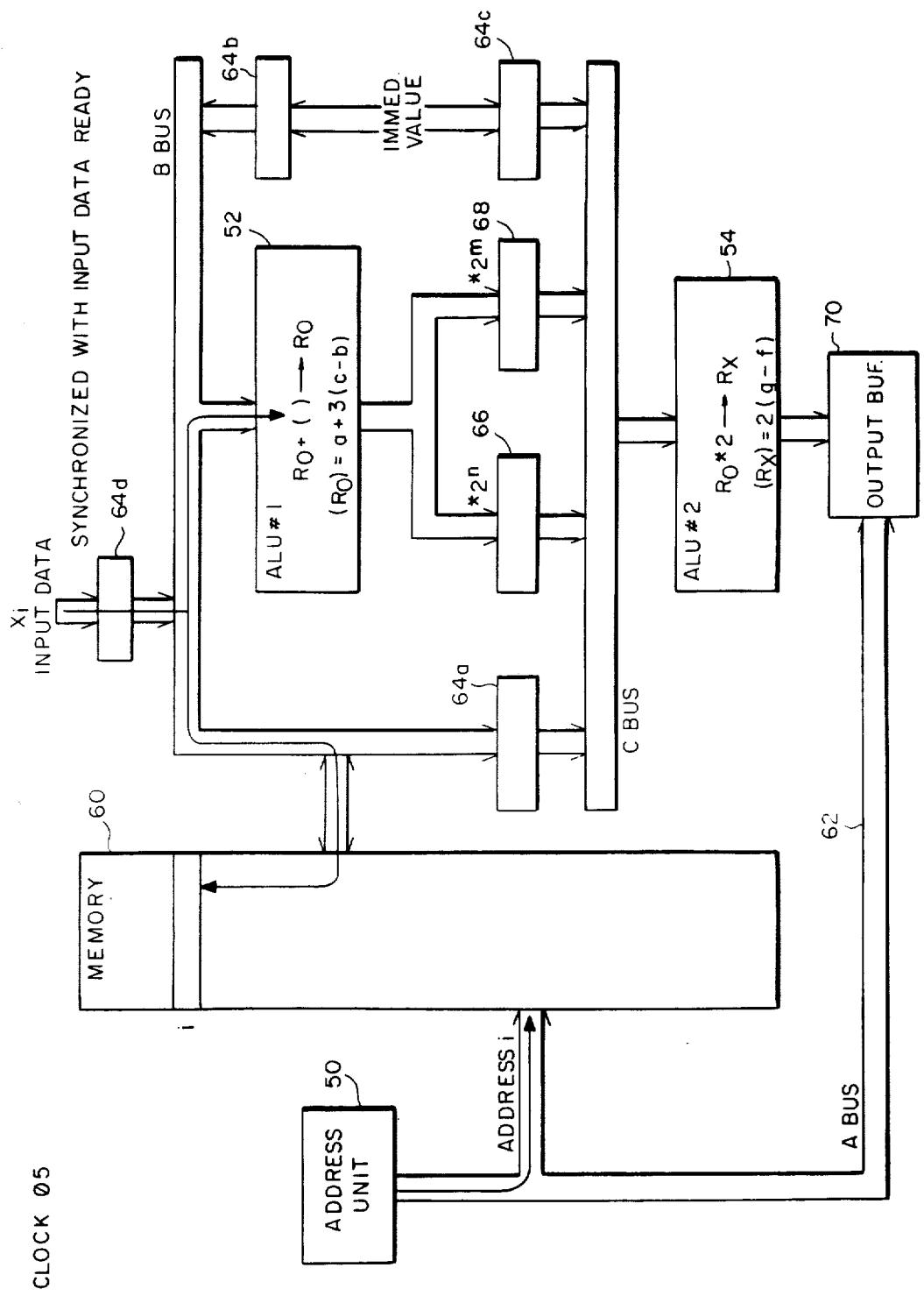

In the fifth clock cycle shown in FIG. 14, the address unit is indexed to the i address and the gating interfaced block 64d is gated to permit entry of a new data sample $X_i$. At this time the instance counter ($R_o$) in the address unit is incremented to reference the current sample, $X_i$. The input data sample represents a new sample data point which is stored in memory unit 60 via a WRITE command in the complex instruction field governing the operation of memory unit 60. Simultaneously, the input data $X_i$ is provided on the B bus as shown in FIG. 14 where it is subsequently gated into ALU1. The input data D is added to the contents of register $R_0$ with the results stored in register $R_0$. The new term corresponds to the parameter a in equation 4 and thus the results shown in column 7 of FIG. 8 correspond to the parameters $a+3(c-b)$. The C bus is not activated during this cycle. ALU2 is busy calculating the middle two terms of equation 5 in which the constant 3 is multiplied by the term $(g-f)$. In clock 5, the quantity $(g-f)$ is multiplied by a value 2 which amounts to a shifting within the register $R_0$ with the results stored in a temporary register $R_x$. Completion of the multiplication by three takes place in the next clock cycle.

Clock 06

Figure 15:
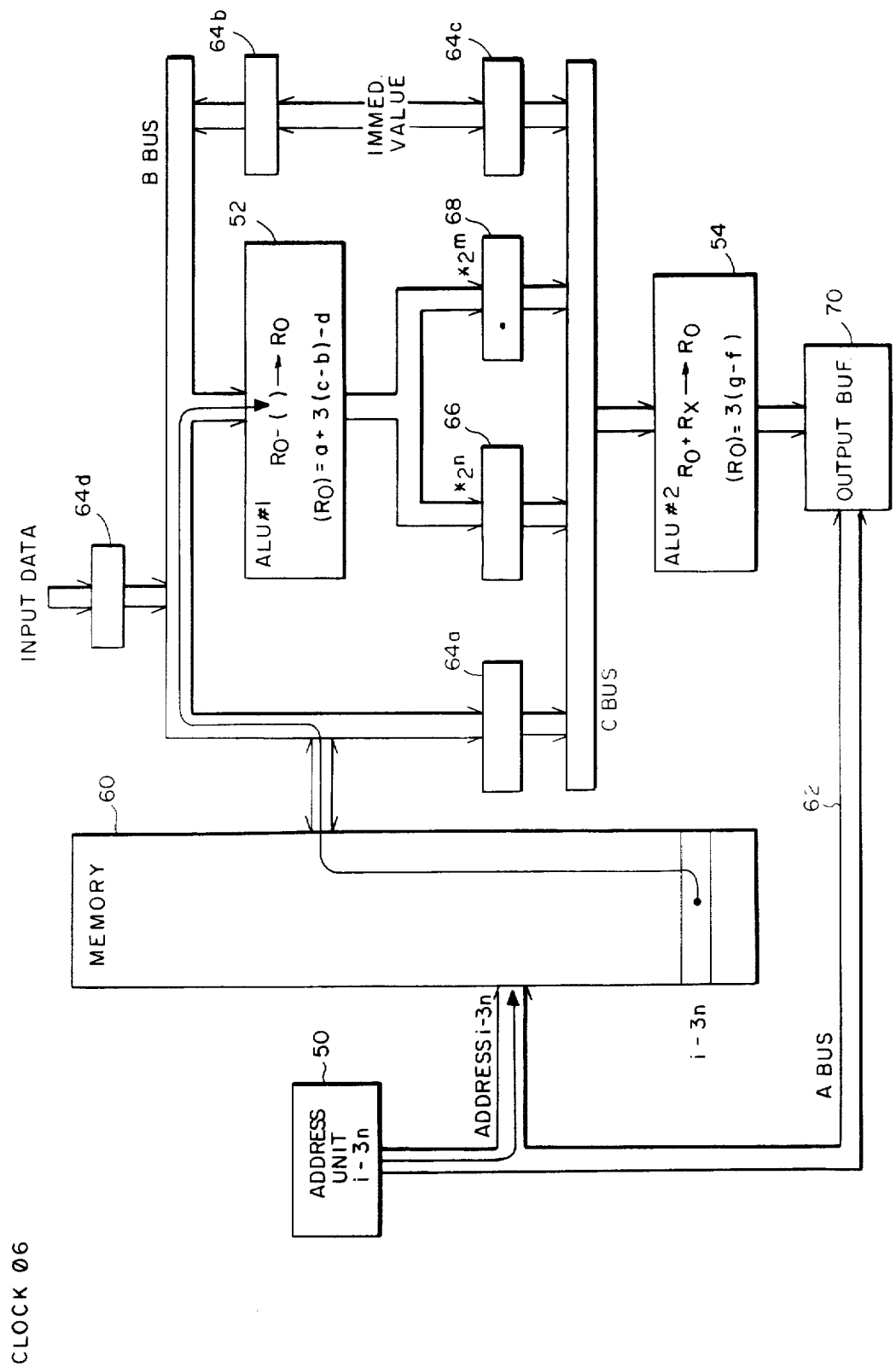

In clock cycle 6, the immediate address unit receives a value $-3n = -24$ so that the address lines are set to designate the $i-3n$ address. The contents of memory location $i-3n$ are accessed within the memory 60 as shown in FIG. 15, and the value is fed to the B bus and gated into a working register of ALU1. The content of the address $i-3n$, termed d, is subtracted from the content of register $R_0$ with the results stored in register $R_0$. This procedure effectively produces all of the terms within equation 4 as indicated in column 7 of FIG. 8. Simultaneously with the memory access and arithmetic operation of ALU1, ALU2 is kept busy completing the multiplication by three. The last step in this multiplication process is to add the contents of temporary register $R_x$ with the content of $R_0$. The results are stored in register $R_0$ which now corresponds to the value $3(g-f)$ as shown in column 11 of FIG. 8.

Clock 07

Figure 16:
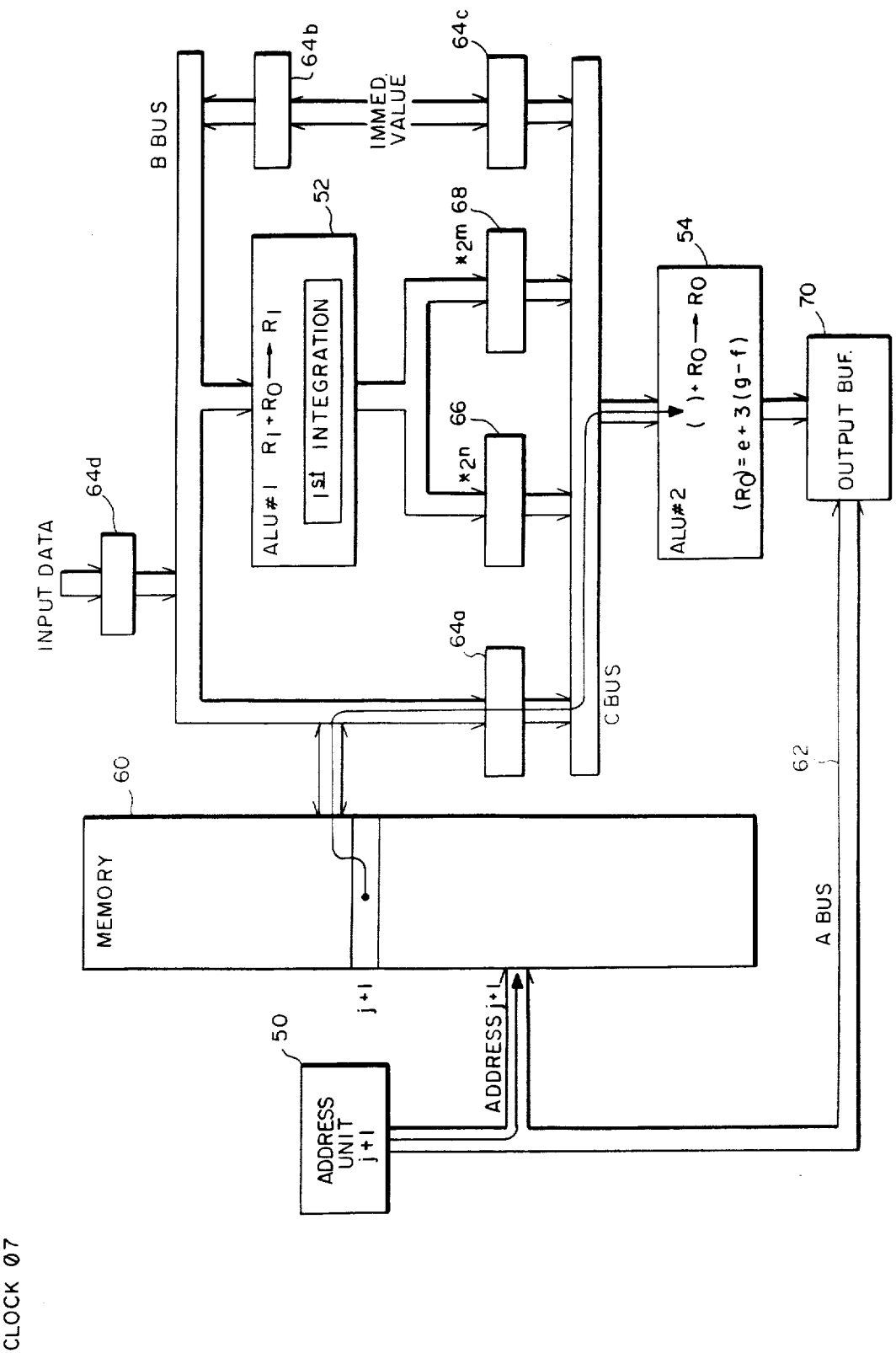

In the next clock cycle, clock 07, an immediate value is added to the contents of the $R_0$ register of the address unit so that the address lines now correspond to the $j+1$ address. The contents of the $j+1$ address are read from memory device 60 and fed via bus B, GIB 64a, and bus C to a working register of ALU2 as shown in FIG. 16. The data value within the working register of ALU2 is added to the contents of register $R_0$ with the results stored in register $R_0$. This addition procedure results in the terms $e+3(g-f)$ as shown in column 10 of FIG. 8. It is to be noted that the $(j+1)$th index for the first term of equation 2 (corresponding to term e in equation 5) is appropriate since the low pass filter is performing its equation for sample values which are one sample interval delayed with respect to the bandpass filter.

At the same time that ALU2 is performing its calculation, ALU1 is performing a summation of the terms $a+3(c-b)-d$ by adding the contents of register $R_0$ to the previous sum value stored in register $R_1$. Thus, ALU1 during the seventh clock cycle is performing a first summation (or first integration) as per equation 1 (alternately equation 4).

Clock 08

Figure 17:
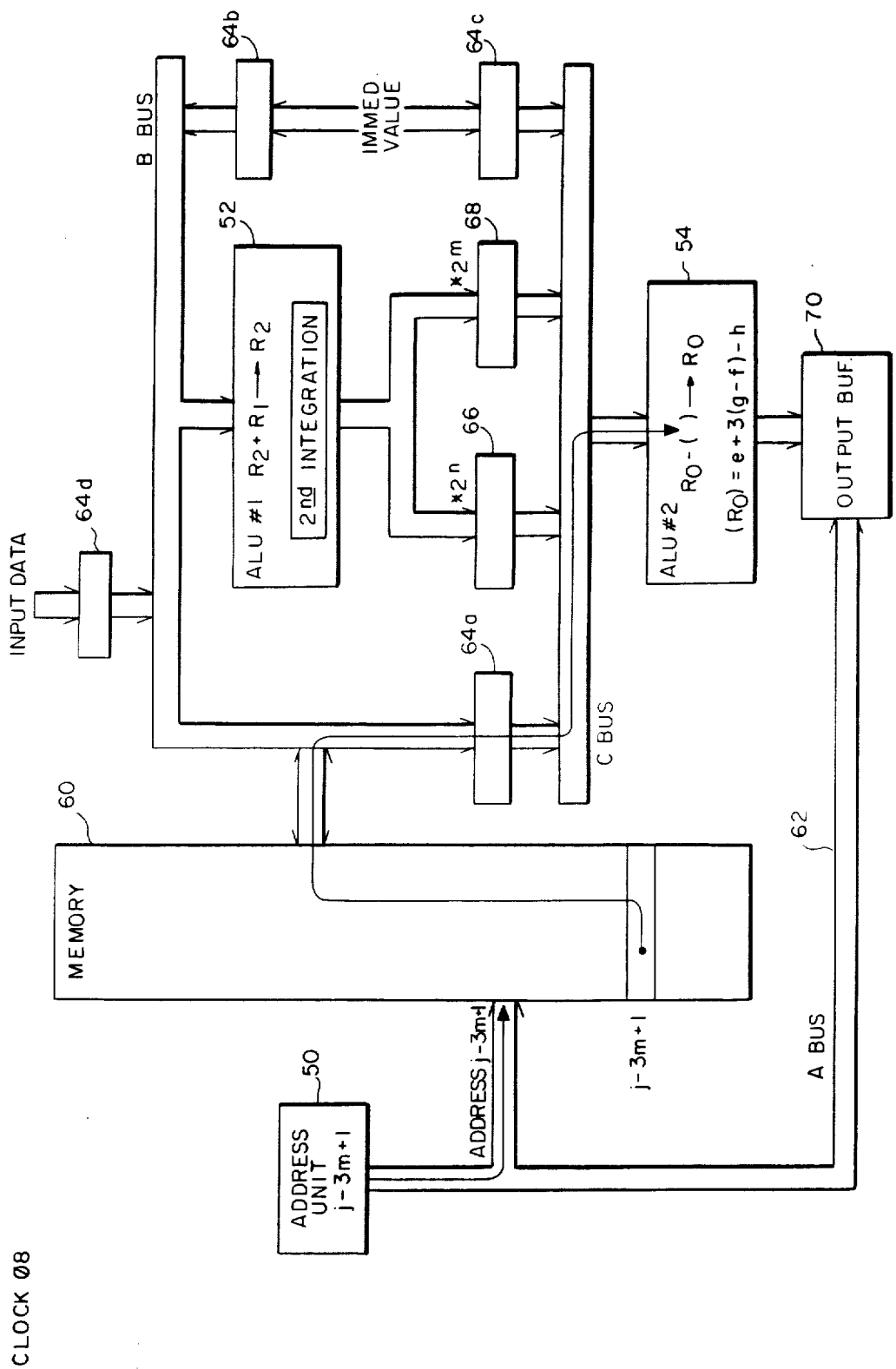

In the next clock cycle, as shown in FIG. 17, the address unit computes the address $j-3m+1$ corresponding to the last term of equation 2 (equation 5) and the content of the address location is read from memory 60 and again passed to ALU2 where it is subtracted from the content of register $R_0$. The results are stored in register $R_0$ which thus contains all of the necessary terms for computing the low pass filter expression as shown in column 10 of FIG. 8.

At the same time that ALU2 is computing the difference value for the low pass filter, ALU1 is performing the second integration by adding the contents of register $R_1$ to the contents of register $R_2$. The resulting sum is stored in register $R_2$.

Clock 09

Figure 18:
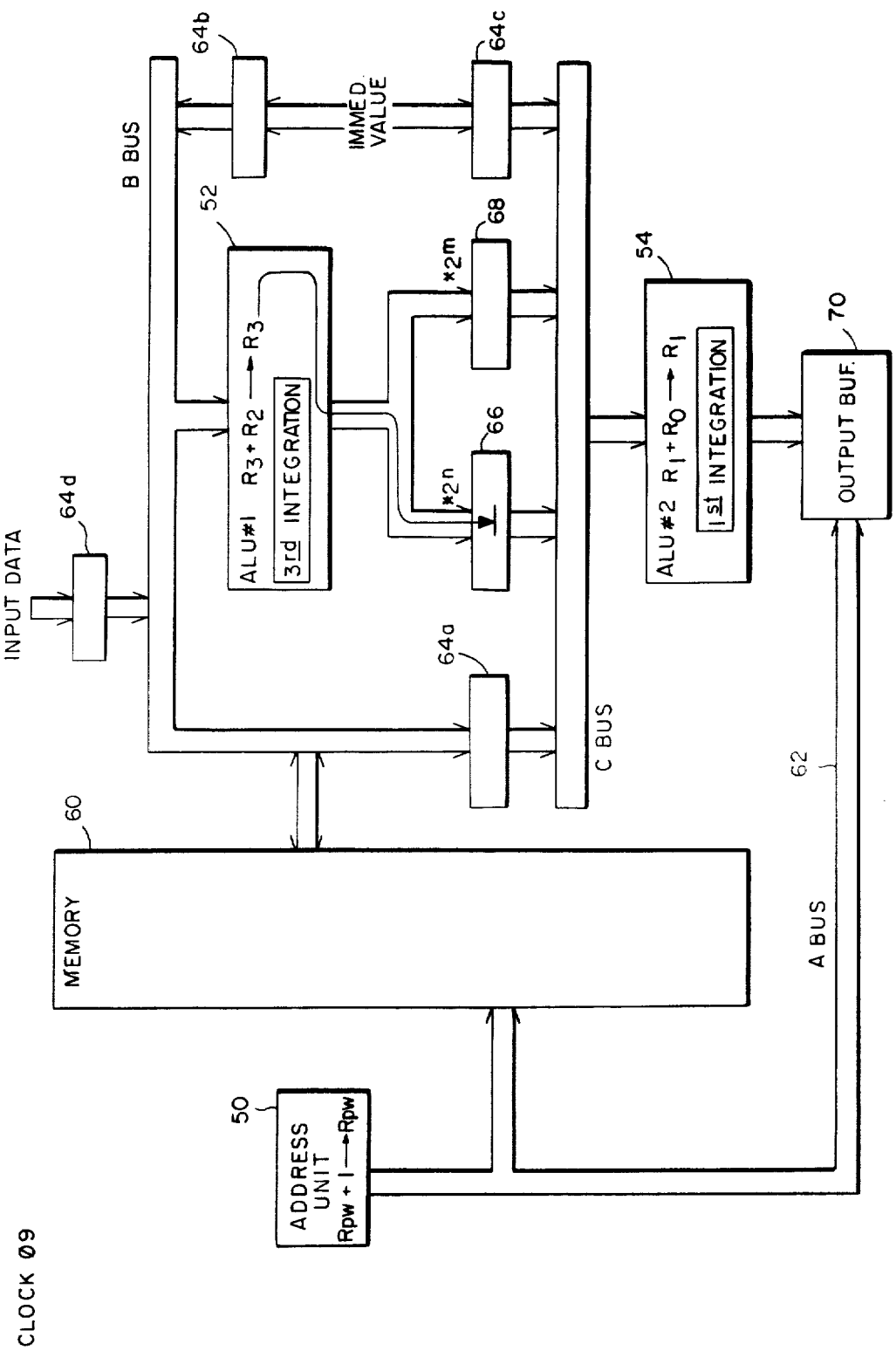

During clock 09, as shown in FIG. 18, the address unit does not provide any addresses to the memory. This is the first time in the calculation in which the memory unit is not busy. Basically, both ALU1 and ALU2 have all of the data they need to perform the required operations during clock 09 and thus no memory access is required.

ALU1 is performing the third integration for the band pass filter by summing the contents of register $R_2$ with the contents of register $R_3$. The resulting sum is stored in register $R_3$. At the same time, ALU2 is performing the first integration of the low pass filter by summing the contents of register $R_0$ with the contents of register $R_1$. The resulting sum is stored in register $R_1$ of ALU2.

It is also to be noted in reference to FIG. 18 that the results of the third integration of ALU1 are gated to the scaler 66 which is hard-wired to have its contents scaled by a factor of $2^{-3}$. In fact, the data lines from ALU1 into the scaler 66 are such as to directly latch the information in the scaled-up configuration. Thus, the output of scaler 66 is directly related to its input by the scaling factor.

Also during clock 09, the address unit 50 increments its internal counter $R_{pw}$ containing the pulse width count. This increment step corresponds to block 107 of the flowchart of FIG. 9.

Clock 10

Figure 19:
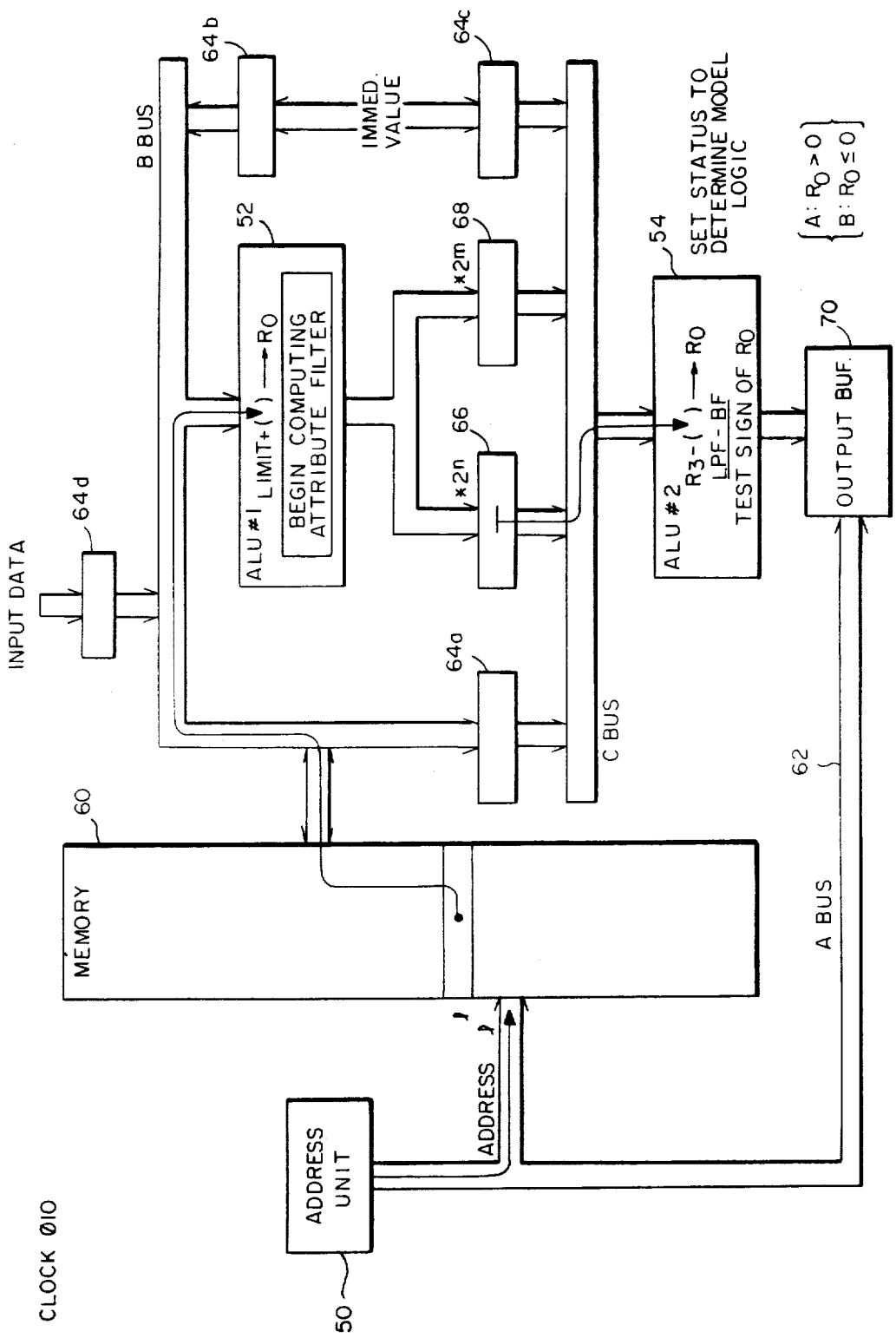

In clock cycle 10, as seen in FIG. 19, the address unit generates address signals corresponding to address 1 and a read command is issued to the memory unit 60. The contents of memory location 1 are gated into ALU1 via the B bus. As part of the attribute filter calculation of equation 3, the data gated into ALU1 is summed with a limit or threshold value stored in internal register $R_y$. The resulting sum is stored in the internal register $R_0$. The spike calculation is designed to take the average value of two sample points on opposite sides of the current sample and to add this average value with a threshold (bias value stored in $R_y$). If the low pass filter value exceeds the sum, it is assumed that the current sample $X_i$ is an unwanted spike, and the sample is subsequently ignored.

At the same time of the ALU1 calculation, data from the scaler 66 is gated onto the C bus and into a working register of ALU2. This data is actually the bandpass filter value in accordance with equation 1. The input data into ALU2 is subtracted from the contents of register $R_3$ which stores a third integration value from a previous low pass filter calculation. This low pass filter calculation was the very one obtained in clock cycle 2. Thus, ALU2 effectively subtracts the low pass filter data from the bandpass filter data and stores the results in the internal register $R_0$. ALU2 also examines the sign bit of register $R_0$ to determine if it is positive or negative. Referring to block 108 of FIG. 9, the sign bit determination provides a status signal to the sequence controller 46 (FIG. 7) so that the subsequent instruction is based upon the results of the subtracted data, i.e., whether the subtracted data is positive or negative. In the following description, it will be assumed that the subtracted data is a positive value so that the next program instruction corresponds to block 109 in FIG. 9. This path may also be identified as clock cycle 11A in which the A is representative of the fact that the A branch was taken from block 108 in FIG. 9. The fact that the low pass filter (LPF) data is larger than the baseband filter (BF) data indicates that a pulse is present. If the LPF is below BF, the pulse is no longer present at the program proceeds to step 11B.

It is noted in clock cycle 10 that the memory unit and ALU1 as well as ALU2 are all busy performing various parts of the overall algorithm. This optimum utilization of the component parts of the system is also characteristic of other clock cycles and is an important aspect of the invention.

Clock 11A

Figure 20:
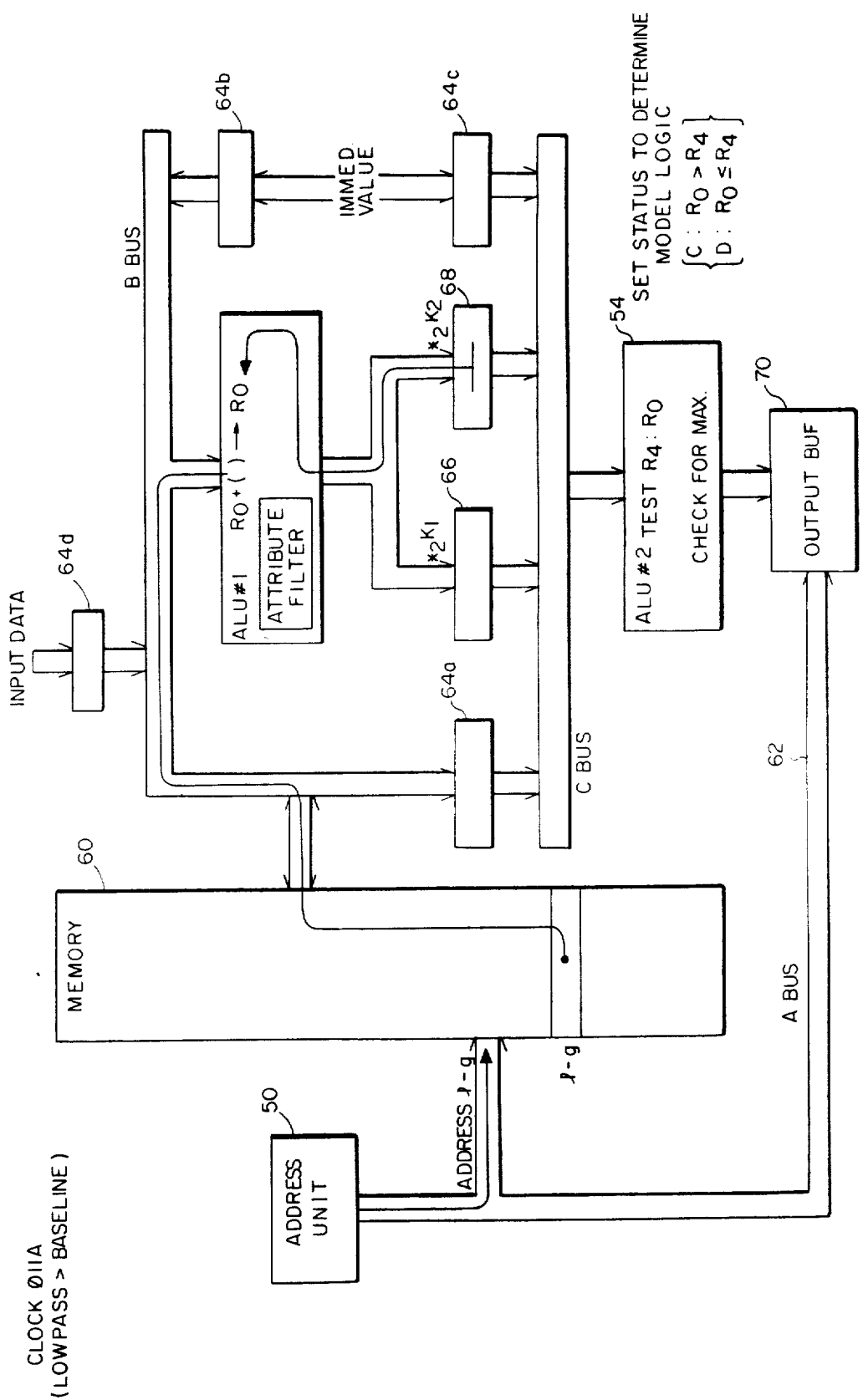

In clock pulse 11A as shown in FIG. 20, the memory content of address $1-g$ is gated onto the B bus and fed into the data input register of ALU1. This data corresponds to the second term of equation 3 for the attribute filter. The data term is added to the contents of register $R_0$ which contained the first term of the attribute filter from the previous clock cycle. The sum of the two terms is stored in register $R_0$ and is also gated into the scaler 68 as shown in FIG. 20. At the same time, ALU2 is comparing the difference value stored in register $R_0$ from the clock cycle 10, with a value stored in register $R_4$ which is the previously highest value of the difference between the low pass and base line filter values. Thus, the comparison step is made to determine whether the current value corresponds to a rising pulse or a falling pulse. This comparison step corresponds to block 109 in FIG. 9. It will be assumed that the branch is made along the path C which corresponds to a rising pulse. The next clock cycle is thus designated 12C giving an indication of the branch taken at decision block 8.

Clock 12C

Figure 21:
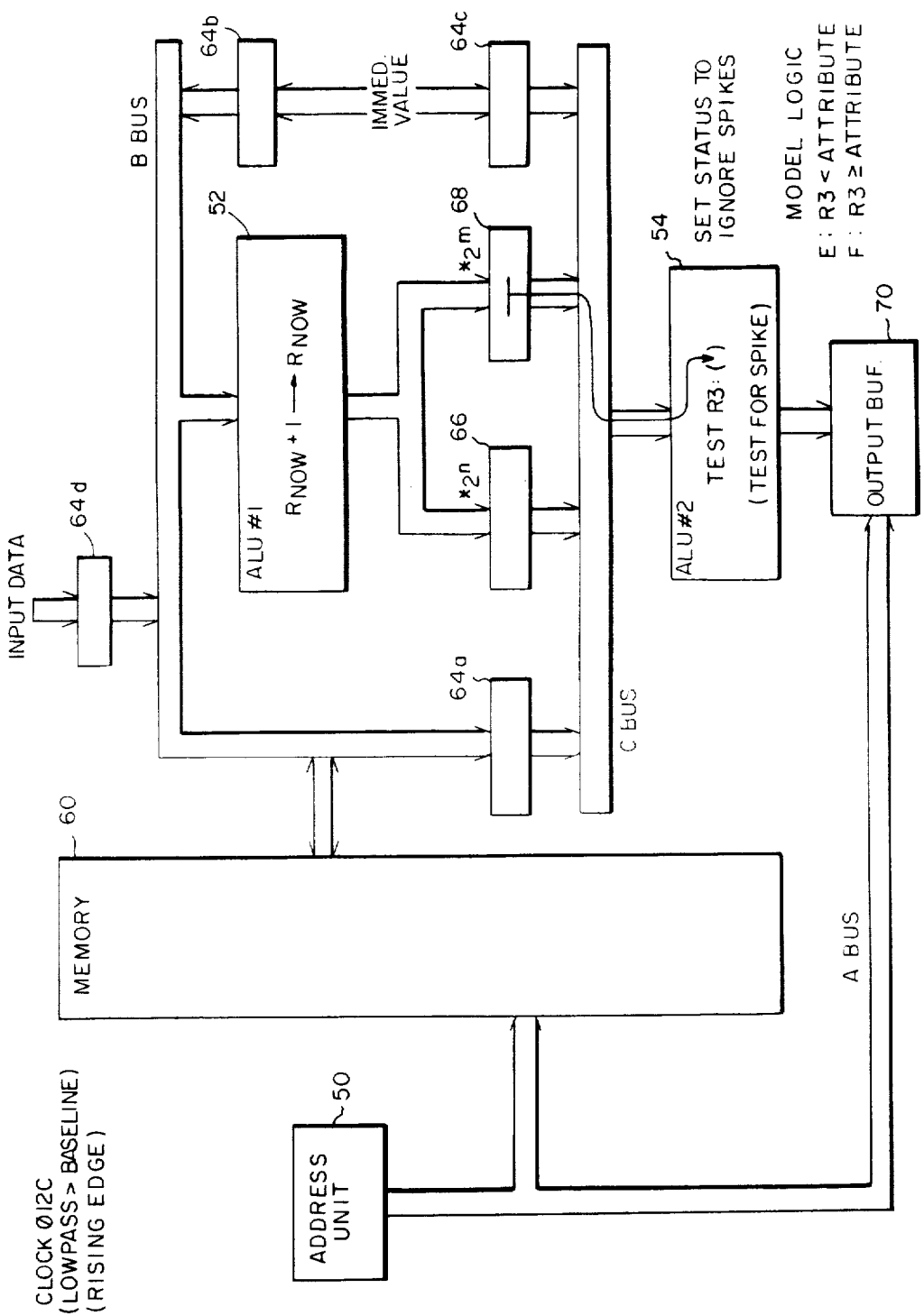
Figure 22:
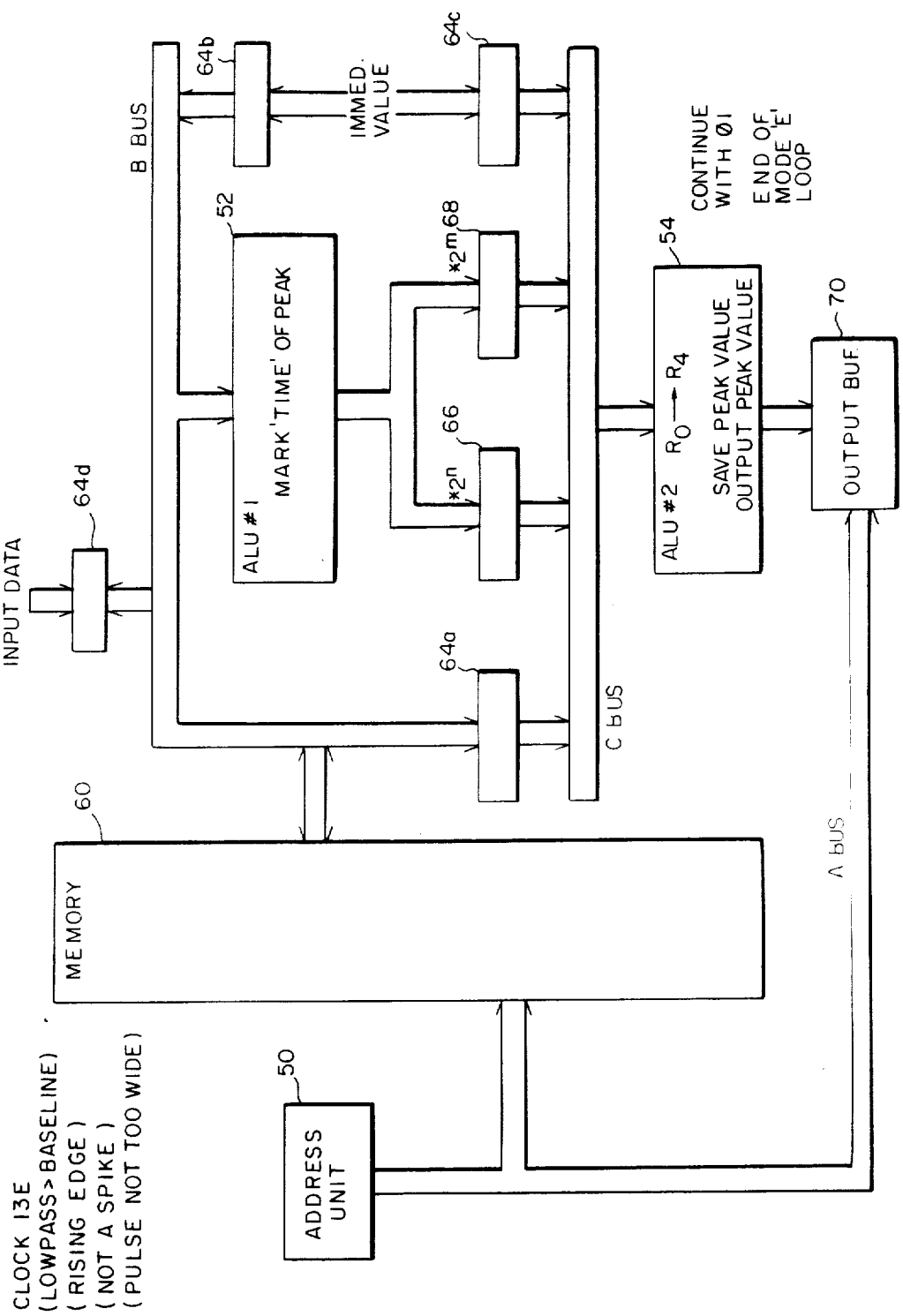

The configuration of the processing elements during clock cycle 12C is illustrated in FIG. 21. During this cycle, ALU1 increments an internal counter designated $R_{now}$ which keeps track of time in units of sample intervals.

At the same time, ALU2 receives the scaled value of the attribute filter (in this case, a spike filter) from the scaler 68, and compares this value with the contents of register $R_3$. Register $R_3$ stores the low pass filter value from clock cycle 2. If the low pass filter value is less than the spike filter value as determined from equation 3, the signal is not a spike and thus will be retained as of interest. If $R_3$ is greater than the attribute filter the value is a spike, and the spike will be ignored by the subsequent data processing steps by setting the "F" status condition. Clock 12C in FIG. 21 corresponds to blocks 110 and 111 in FIG. 9. It is assumed that the status condition E is satisfied in FIG. 21 such that the contents of register $R_3$ are less than the spike filter value. Under these conditions, FIG. 9 illustrates that the program instruction sequence goes to block 112 which corresponds to clock cycle 13E.

Clock 13E

During the 13E cycle time, ALU1 keeps track of the time at which the peak was determined to occur. Thus the value of the instance counter is stored in $R_{tpeak}$. The time of the occurrence of the peak value is important for determination of range and azimuth values and in many different signal processing applications. The peak value is also important for determining other characteristics of the object being scanned. In this connection, it is noted that the output values are provided to subsequent signal processing equipment and that the purpose of the initial signal processing stage is to provide an initial screening of the data, i.e., to separate the signals from the noise. Basically, the signal processing provides filtering for the wideband sensor data so that data signal representative of the target can be determined from the multitude of input signals. The signal processor thus is utilized to reduce bandwidth and increase signal information. The output of the filter is typically a small number of peaks compared to a large number of input samples.

ALU2 in clock cycle 13E stores the difference data between the low pass and base line filters calculated in clock cycle 10 into the register $R_4$. This transfer operation is done since register $R_4$ holds the current maximum value utilized in a subsequent run through the instruction sequence. ALU2 also saves the peak value and provides an output of same to the output buffer and subsequently to further data processing apparatus (not shown). The output is effective by placing the address $1+R_{fill}$ on the A bus. Each time a new maximum is found, the new maximum value is overwritten on this same output buffer address. Downstream equipment will subsequently read this maximum peak value only when the peak time value is also provided which occurs during clock 13I. Clock 13E corresponds to steps 112, 113 and 114 of FIG. 9.

At step 114, the program returns to clock 1, and the process is repeated. It is clear that different sequences may take place with different branches through the flow chart. These alternative sequences may be understood in reference to the description of the following clock pulses.

Clock 12D

Clock 12D corresponds to the case where a pulse is being found, but this sample is not larger than previous observations. This condition is found on the falling edge of a pulse. In this case, the address unit 50 does no useful work (idles), ALU1 marks the passage of time by incrementing $R_{now}$ (the sample interval counter), and ALU2 does no useful work. This clock pulse corresponds to block 115 in FIG. 9.

Clock 13F

This instruction corresponding to block 116 in FIG. 9 does no useful work and is optional. It is included only to make all processing paths the same length, i.e., 13 clocks are consumed to process every data sample input. Block 117 again returns the program to clock 1.

Clock 13F is also executed after clock 12C if the current sample is determined to be a spike. Effectively, the incoming data point is ignored and the program proceeds via step 118 (optional) and step 119 to return to clock 1.

Clock 11B

Clock 11B is executed when the new products of the filters do not indicate a pulse, i.e., the time period between pulses. For this case the address unit 50 performs an arithmetic test on its internal register which holds the "pulse width counter" $R_{pw}$ (incremented at clock 9). The value of $R_{pw}$ is determined to be within or outside of the range specified by $R_{pwmin}$ and $R_{pwmax}$. The result of this comparison is fed to the sequence controller in the form of a status signal (i.e., the carry bit determines if the pulse value was "out-of-range" or not).

ALU1 recalls the time of the pulse's peak by outputting the contents of $R_{tmax}$ to the interface latch 68. ALU2 performs an amplitude test by comparing $R_4$ with the maximum acceptable pulse amplitude which has been restored in $R_{limit}$. The results of this test are fed to the sequence controller as a status signal (i.e., the sign bit).

On this clock cycle, the sequence controller is presented with two status bits (the carry out of the address unit and the sign bit from ALU2) which determine the subsequent machine state. State "H" means that a legitimate pulse has been found and should be recorded into the output buffer, and state "G" means that there is no legal pulse—either its amplitude was too high, or its width was out-of-bounds. Clock 11B corresponds to steps 120 and 121 of FIG. 9.

Clock 12G

This state indicates that there is not a legal pulse to pass on for further processing. In this case, the address unit 50 resets the pulse width register to an initial value = — minimum pulse width. ALU1 advances the time clock by incrementing the $R_{now}$ register to mark the passage of another sample interval time unit. ALU2 (54) resets the maximum pulse amplitude by clearing $R_4$.

The next instruction to be executed is 13F, and the program subsequently returns to clock 1. The sequence of steps correspond to blocks 122, 123 and 124 of FIG. 9.

Clock 12H

Clock 12H signifies that a legal pulse has been found and is to be submitted to the output buffer interface 70. Recall that on the previous maximum pulse sample, clock 13E, the maximum amplitude was recorded into the output interface unit. On this 12H instruction the address unit 50 initializes the pulse width register $R_{pw}$ for measuring the width of the next pulse. ALU1 advances the peak detection clock by incrementing the sample counter $R_{now}$. ALU2 resets the maximum peak amplitude by clearing $R_4$. This instruction is identical to the "12G" instruction except that the execution continues with clock 13I (as opposed to the NO-OP instruction of clock 13F). This allows implementation of the state conditional logic one instruction later which supports a pipeline configuration in the sequence controller portion of the invention.

Clock 13I

This is the state which signifies that a previously found, legal pulse is formally passed onto the output interface buffer for subsequent processing by other downstream elements. The address unit 50 advances the output buffer fill pointer $R_{fill}$ by two and places this result back into the A bus where it passes to the output interface buffer 70 as a location address. The complex instruction commands the output interface buffer to accept information from ALU2 and record it as "the observation time of the peak amplitude". ALU1 is idle during this clock state. ALU2 passes the time of the peak from the sealer (68) thru to its output which is presented to the output interface buffer 70.

The next instruction to be executed will be a clock 1 and the process will continue. These steps for clock 13I correspond to blocks 125-128 of FIG. 9.

Initialization of the program simply involves initializing the various registers via the "immediate value ports" (64b and 64c).

Specific timing considerations as to when the address bus must be stable for the memory to be accessed may require that the address unit code be "rotated forward" one clock, i.e., addresses being calculated one step earlier than shown in the example. Such rotation may involve a dummy clock 0 (or clock 14), but the overall operation would remain as illustrated in the foregoing discussion.

It is to be noted that the particular sequence of instructions illustrated in FIG. 8 presents a solution to the filter algorithm with relatively few clock cycles. The small number of clock cycles is possible due to the multiplicity of operating units such as separate address units 50, ALU1 and ALU2. Utilizing only a conventional single instruction, single data machine, the same operations would take 50 or more clock cycles. The additional cost in performing the process with separate processing units is more than compensated for by the faster implementation of the process especially where speed is important as, for example, in real time signal processing applications.

Moreover, the architectural configuration utilizing the complex instruction permits the utilization of separate asynchronous units which operate synchronously with respect to execution of the instructions by the very fact that the complex instruction is presented to each of the programmable units 50, 52 and 54 (FIG. 7) at the same time. The program, of course, must be written initially to take advantage of the parallelism inherent in the computational problem to be solved. However, the utilization of the complex instruction with separate asynchronous units greatly simplifies and, to a large extent, eliminates a supervisory role played by a master computer in controlling the computational processes carried out by a plurality of slave computers. In accordance with the principles of the invention, the complex instruction itself will automatically direct each of the system programmable units to operate in accordance with its separate field instruction so that memory contention and I/O contention problems can be programmed out from the very beginning.

The block diagram of FIG. 7 may be implemented utilizing any number of existing microprocessors and sequence controller chips. As an example of such implementation, the address unit 50, and the ALU units 52 and 54 may each be fabricated from AM2901B chips or AM2903 four-bit bipolar microprocessor slices. The fields of the complex instruction which are fed to each unit 50, 52 and 54 are sufficient to completely specify the operation of the units for the function desired. These source, function and distinction codes are specified within the fields. The sequence controller 46 may comprise the AM2910 microprogrammed controller. These chips are available from Advanced Micro Devices, Inc. of Sunnyvale, Calif. It is noted that the address unit 50 need not be a full-fledged bit-sliced microprocessor although it is relatively easy to fabricate each of the programmable units from the same types of chips, i.e., 2901-2903.

Figure 23:
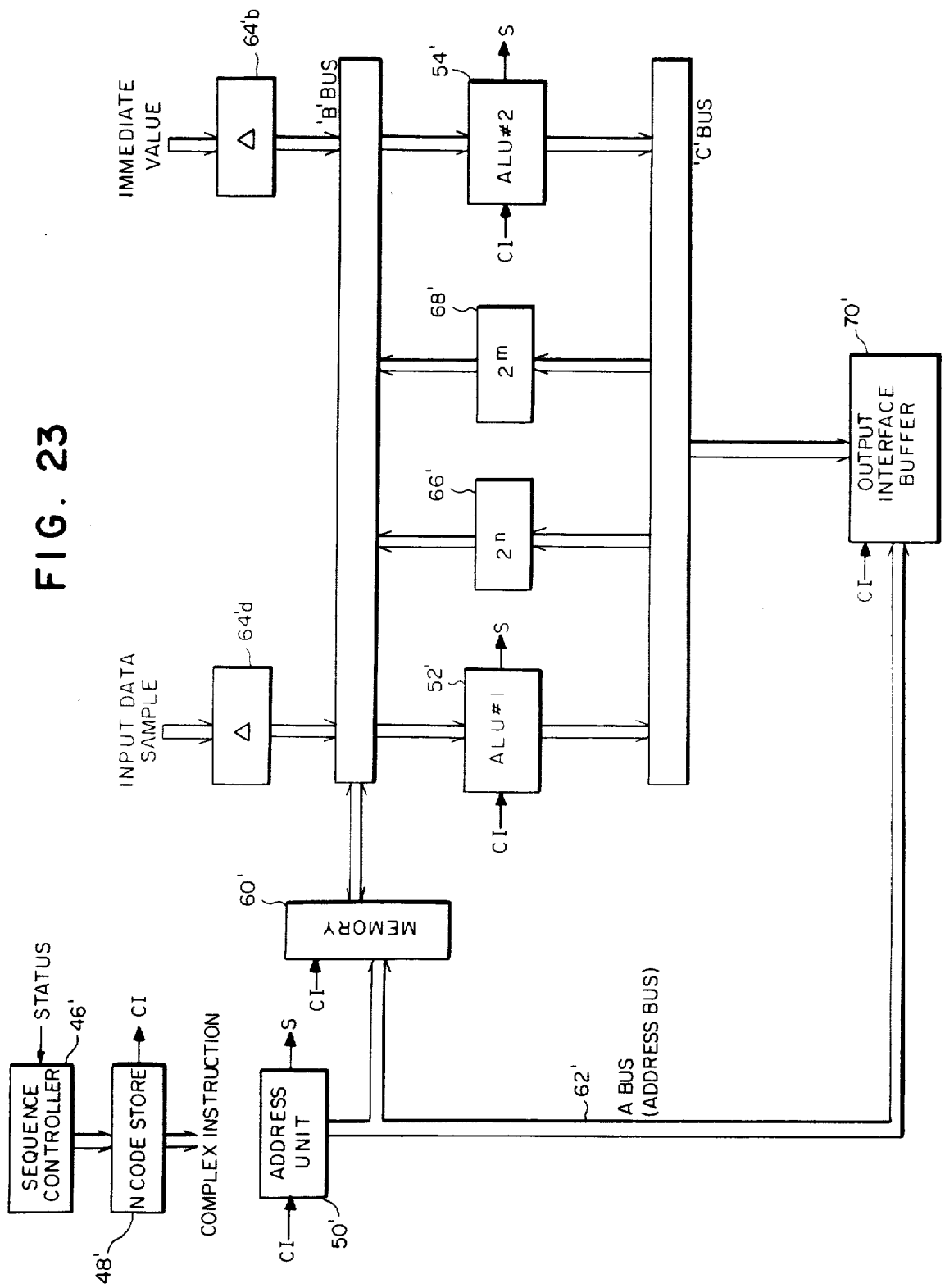
FIG. 23 shows a block diagram of the major components of the invention arranged as an alternative to FIG. 7.

It is to be understood that the embodiment illustrated in FIG. 7 represents a configuration which is optimal for providing a solution to the filtering equations 1, 2 and 3. An alternate arrangement is illustrated in FIG. 23 where prime numbers correspond to the unprimed numbers of FIG. 7.

Figure 24:
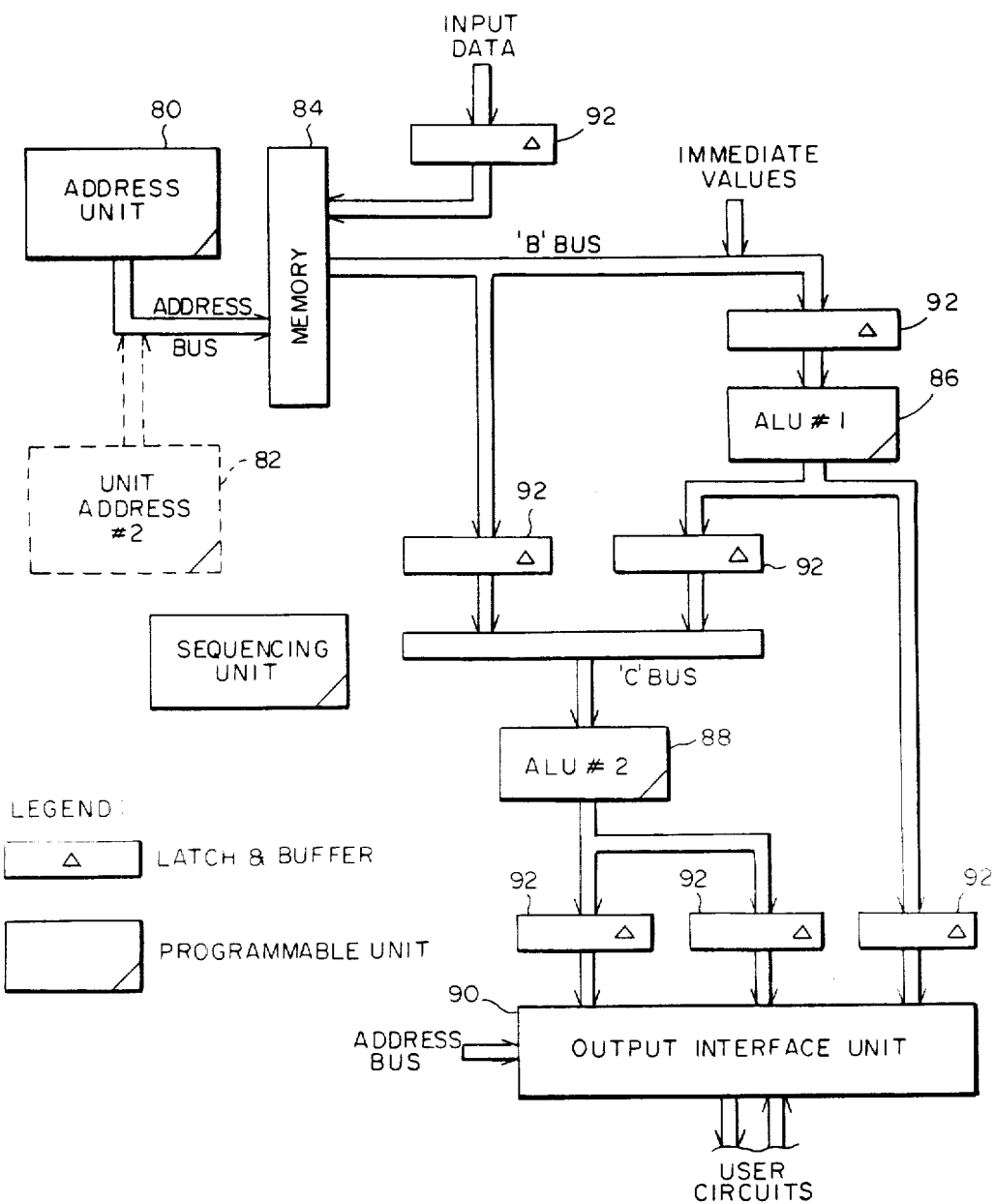
FIG. 24 shows a block diagram of major components of the system architecture representing another, more generalized implementation of the invention.

A more general architectural configuration is illustrated in FIG. 24, wherein two separate address units 80 and 82 may each be employed to access memory 84. Such a dual addressing configuration is possible especially if the memory is relatively small and fast. Also shown in FIG. 24 are separate ALU units 86 and 88, each separately connectable to an output interface unit 90. ALU 86 is also connectable to ALU 88 via one of the gates 92 serving as a latch/buffer. Depending upon the control signals to the various gates 92, the structure of FIG. 24 may be configured to be similar to that of FIG. 7.

While the invention has been described in terms of a preferred embodiment as set forth above, it is evident that modifications and improvements may be made by those of skill in the art, and it is understood that, within the scope of the appended claims, the invention may be practical with such modifications and improvements.

What is claimed is:

1. A data processor comprising:
   (a) a sequence controller for generating complex instruction address signals identifying addresses of complex instructions, a plurality of said complex instructions forming a program for solving an algorithm,
   (b) program memory storage means for storing said complex instructions at address locations identified by said address signals,
   (c) a first and second arithmetic and logic unit (ALU) for processing data in accordance with said complex instructions from said program memory storage means,
   (d) said complex instructions having first fields for providing first instructions to said first ALU, and distinct, second fields for providing distinct, second instructions to said second ALU,
   (e) said first and second fields of said complex instructions simultaneously transmitted respectively to said first and second ALUs for synchronizing the operation of said first and second ALUs in executing said program,
   (f) a data memory storage device for storing data,
   (g) a data address unit connected to said data memory storage device for generating data addresses to control storage and retrieval of data in said data memory storage device,
   (h) said complex instructions including third fields for providing data address instructions,
   (i) said data address unit connected to receive said data address instructions of said third fields from said program memory storage device for selecting said data addresses to be generated,
   (j) said first and second ALUs connected to receive data from said data memory storage device, and said third fields of said complex instruction transmitted simultaneously with said first and second fields to synchronize data storage and retrieval of said data memory storage device.

2. A data processor as recited in claim 1, includes means for connecting said first and second ALU's to receive data from said data memory storage device during execution of different complex instructions and therefore at different times to prevent simultaneous access to said data memory storage device.

3. A data processor as recited in claim 1, includes means for generating in said first and second ALUs status signals in response to execution of respective first and second fields of said complex instructions, said sequence controller includes means for receiving said status signals and operative to select complex instructions to be executed in response to said received status signals.

4. A data processor as recited in claim 3, wherein said address unit includes means for generating additional status signals, said sequence controller receiving means being connected to receive said additional status signals and operative to select complex instructions to be executed in response to both said received status and additional status signals.

5. A data processor as recited in claim 1, including means for connecting said first ALU to output data to said second ALU.

6. A data processor as recited in claim 5, further comprising a scaler interconnected between said first and second ALUs to effect one of multiplication or division of data from said first ALU to said second ALU.

7. A data processor as recited in claim 5, further comprising a latch interconnected between said first and second ALUs.

8. A high speed digital signal processor comprising:
  (a) program memory storage means for storing a program to be executed, said program solving a given computational problem,
  (b) said program having a plurality of complex instructions, and each complex instruction being composed of a plurality of segments,
  (c) a plurality of arithmetic and logic units (ALUs) operative to process data in accordance with said complex instructions, each ALU operative in response to a predetermined one of said segments of said complex instructions,
  (d) a data memory storage device for storing data for processing by said plurality of ALUs, said data memory storage device operatively connected to each of said plurality of ALUs,
  (e) a data address selection unit connected to said data memory storage device and operative to address storage locations of said data memory storage device for reading and writing data therein, said address selection unit operative in response to a predetermined one of said segments of said complex instructions,
  (f) means for selecting the complex instructions of said program for simultaneously generating said plurality of segments for feeding said plurality of ALUs and said data address selection unit to synchronize operation of same on an instruction-by-instruction basis, and
  (g) said complex instructions operative to control said plurality of ALUs and said data address selection unit to effect simultaneous operation of said plurality of ALUs during execution of a major portion of said program.

9. A high speed digital signal processor as recited in claim 8, includes means for synchronizing said complex instructions and controlling said plurality of ALUs to enable data transfer from said data memory storage device to only one of said plurality of ALUs during any given complex instruction.

10. A high speed digital signal processor as recited in claim 8, wherein said plurality of ALUs include means for generating status signals in response to execution of respective segments of said complex instructions, said selecting means includes means for receiving said status signals and operative to select complex instructions to be executed in response to said received status signals.

11. A high speed digital signal processor as recited in claim 10, wherein said data address selection unit includes means for generating additional status signals, said selecting means includes means for receiving said additional status signals and operative to select complex instructions to be executed in response to both said received status and additional status signals.

12. A method of processing data comprising the steps of:
  (a) storing a plurality of complex instructions in an instruction memory storage device, said complex instructions collectively forming a program for processing data and each complex instruction having a plurality of separate fields,
  (b) generating signals representative of said complex instructions stored in said instruction memory storage device, each of said plurality of fields being simultaneously generated,
  (c) connecting a first arithmetic and logic unit (ALU) to receive signals representative of said first fields of said complex instructions,
  (d) connecting a second ALU to receive signals representative of second fields of said complex instructions,
  (e) connecting a data memory address unit to receive third fields of said complex instructions,
  (f) storing data to be processed in a data memory storage device having data memory storage locations accessed by said data memory address unit,
  (g) programming said fields of said complex instructions to permit only one of said first and second ALUs to access said data in said data memory storage device during any one given complex instruction, thereby eliminating data memory access contention among said first and second ALUs, and
  (h) controlling execution of said program by simultaneously feeding the first, second and third fields of each complex instruction to said first ALU, said second ALU and said data memory address unit respectively.

13. A method of processing data comprising the steps of:
  (a) storing a plurality of complex instructions in an instruction memory storage device, said complex instructions collectively forming a program for processing data and each complex instruction having a plurality of separate fields,
  (b) generating signals representative of said complex instructions stored in said instruction memory storage device, each of said plurality of fields being simultaneously generated,
  (c) connecting a first arithmetic and logic unit (ALU) to receive signals representative of said first fields of said complex instructions, (d) connecting a second ALU to receive signals representative of second fields of said complex instructions, (e) connecting a data memory address unit to receive third fields of said complex instructions, (f) storing data to be processed in a data memory storage device having data memory storage locations accessed by said data memory address unit, (g) programming said fields of said complex instructions to effect high utilization of each of said first and second ALUs during execution of said program, and (h) controlling execution of said program by simultaneously feeding the first, second and third fields of each complex instruction to said first ALU, said second ALU and said data memory address unit, respectively.

* * * * *